(12) United States Patent
Murayama

(10) Patent No.: US 11,644,945 B2
(45) Date of Patent: May 9, 2023

(54) RECORDING MEDIUM, INFORMATION PROCESSING METHOD, AND INFORMATION PROCESSING APPARATUS

(71) Applicant: CASIO COMPUTER CO., LTD., Tokyo (JP)

(72) Inventor: Yoichi Murayama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/458,836

(22) Filed: Aug. 27, 2021

(65) Prior Publication Data

US 2022/0083200 A1 Mar. 17, 2022

(30) Foreign Application Priority Data

Sep. 16, 2020 (JP) .............................. JP2020-155351

(51) Int. Cl.
*G06F 3/04817* (2022.01)
*G06N 20/00* (2019.01)
(Continued)

(52) U.S. Cl.
CPC ........ *G06F 3/04817* (2013.01); *G06F 3/0482* (2013.01); *G06F 3/0484* (2013.01); *G06N 20/00* (2019.01)

(58) Field of Classification Search
CPC .. G06F 3/04817; G06F 3/0482; G06F 3/0484; G06F 9/453
See application file for complete search history.

(56) References Cited

U.S. PATENT DOCUMENTS 6,469,770 B2 10/2002 Hoshino et al.
6,774,980 B2 8/2004 Hoshino et al.
(Continued)

FOREIGN PATENT DOCUMENTS

JP 2004355392 A * 12/2004
JP 2004355392 A 12/2004
(Continued)

OTHER PUBLICATIONS

Japanese Office Action dated May 10, 2022 (and English translation thereof) issued in counterpart JP Application No. 2020-155351.

*Primary Examiner* — Mong-Shune Chung
(74) *Attorney, Agent, or Firm* — Holtz, Holtz & Volek PC

(57) ABSTRACT

A non-transitory computer-readable recording medium storing a program executable by at least one processor of an information processing apparatus, wherein the at least one processor acquires first state data indicating a state in which a first target person has used a functional element realized by execution of a target program, acquires estimation data for estimating information on the functional element matched to the first target person, in accordance with an arithmetic model, on the basis of the acquired first state data, the arithmetic model being generated by machine learning based on at least one of second state data indicating a state in which a second target person different from the first target person has used the functional element in the past and the first state data saved in the past, and causes a presentation unit to present the information on the functional element on the basis of the acquired estimation data.

18 Claims, 10 Drawing Sheets

(51) Int. Cl.
    *G06F 3/0484*     (2022.01)
    *G06F 3/0482*     (2013.01)

(56) References Cited

U.S. PATENT DOCUMENTS

| | | | |
|---|---|---|---|
| 7,689,916 B1* | 3/2010 | Goel | G06F 9/453 |
| | | | 715/744 |
| 10,210,217 B2 | 2/2019 | Yoshitake et al. | |
| 10,902,008 B2 | 1/2021 | Yoshitake et al. | |
| 2006/0123341 A1* | 6/2006 | Smirnov | G06F 3/0481 |
| | | | 715/764 |
| 2009/0019099 A1* | 1/2009 | Kunz | G06F 40/111 |
| | | | 708/200 |
| 2011/0246880 A1* | 10/2011 | Horton | G06F 3/0481 |
| | | | 715/708 |
| 2014/0331132 A1* | 11/2014 | Kitagawa | G06F 3/0481 |
| | | | 715/764 |
| 2016/0203004 A1* | 7/2016 | Strong | G06F 3/04842 |
| | | | 715/708 |
| 2021/0103595 A1 | 4/2021 | Yoshitake et al. | |
| 2021/0271498 A1* | 9/2021 | Morota | G06F 9/453 |

FOREIGN PATENT DOCUMENTS

| | | | |
|---|---|---|---|
| JP | 2011238283 A | 11/2011 | |
| JP | 2014238686 A | 12/2014 | |
| WO | 2014192214 A1 | 12/2014 | |
| WO | 2020059428 A1 | 3/2020 | |

\* cited by examiner

| TAG TYPE | SCORE VALUE |
|---|---|
| GENERAL CALCULATION | 0.25 |
| GRAPH | 0.25 |
| MATHEMATICAL EXPRESSION | 0 |
| SLIDER | 0 |
| FORMULA-USE MATHEMATICAL TABLE | 0 |
| GEOMETRY | 0 |
| STATISTICS-USE MATHEMATICAL TABLE | 0 |
| STATISTICAL CALCULATION | 0 |
| NUMERICAL SEQUENCE CALCULATION | 0 |
| FINANCIAL CALCULATION | 0.25 |
| TEXT | 0.25 |

FIG. 10

| TAG TYPE | SCORE VALUE | RANK | PRESENTED TUTORIAL (LEVEL) |
|---|---|---|---|
| GENERAL CALCULATION | 0.25 | (2) | (2) |
| GRAPH | 0.4 | (1) | (1) |
| MATHEMATICAL EXPRESSION | ... | ... | ... |
| SLIDER | ... | ... | ... |
| FORMULA-USE MATHEMATICAL TABLE | ... | ... | ... |
| GEOMETRY | 0.15 | (3) | (2)+(3) |
| STATISTICS-USE MATHEMATICAL TABLE | 0.03 | (6) | (4)+(5)+(6) |
| STATISTICAL CALCULATION | ... | ... | ... |
| NUMERICAL SEQUENCE CALCULATION | 0.05 | (5) | (4)+(5) |
| FINANCIAL CALCULATION | 0.1 | (4) | (4)+(3) |
| TEXT | 0.02 | (7) | (4)+(5)+(6)+(7) |

| TAG TYPE | COORDINATE VALUES |
|---|---|
| GENERAL CALCULATION | (x01, y01) |
| GRAPH | (x02, y02) |
| MATHEMATICAL EXPRESSION | (x03, y03) |
| SLIDER | (x04, y04) |
| FORMULA-USE MATHEMATICAL TABLE | (x05, y05) |
| GEOMETRY | (x06, y06) |
| STATISTICS-USE MATHEMATICAL TABLE | (x07, y07) |
| STATISTICAL CALCULATION | (x08, y08) |
| NUMERICAL SEQUENCE CALCULATION | (x09, y09) |
| FINANCIAL CALCULATION | (x10, y10) |
| TEXT | (x11, y11) |

RECORDING MEDIUM, INFORMATION PROCESSING METHOD, AND INFORMATION PROCESSING APPARATUS

BACKGROUND

1. Field

The present invention relates to a recording medium, an information processing method, and an information processing apparatus.

2. Related Art

Japanese Patent Application Laid-Open No. 2011-238283 discloses a technology in which a plurality of process selection buttons and an explanation button are displayed, wherein with a process selection button being pressed, a process to be executed is selected, and with the explanation button being pressed, an explanation of the process selection buttons is displayed together with the process selection buttons.

However, with the technology described in Japanese Patent Application Laid-Open No. 2011-238283, when the explanation button is pressed, an explanation screen displaying the explanation corresponding to all of the plurality of process selection buttons being displayed is superimposed on the process selection screen. As a result, the explanation information may be presented by many unnecessary displays, which would likely degrade the user convenience.

SUMMARY

A recording medium according to an embodiment of the present invention is a non-transitory computer-readable recording medium storing a program executable by at least one processor of an information processing apparatus, wherein the at least one processor is operative to:

acquire first state data indicating a state in which a first target person has used a functional element realized by execution of a target program;

acquire estimation data for estimating information on the functional element matched to the first target person, in accordance with an arithmetic model, on the basis of the acquired first state data, the arithmetic model being generated by machine learning based on at least one of second state data indicating a state in which a second target person different from the first target person has used the functional element in a past and the first state data saved in a past; and cause a presentation unit to present the information on the functional element on the basis of the acquired estimation data.

An information processing method according to an embodiment of the present invention is an information processing method of an information processing apparatus, wherein the method includes:

acquiring first state data indicating a state in which a first target person has used a functional element realized by execution of a target program;

acquiring estimation data for estimating information on the functional element matched to the first target person, in accordance with an arithmetic model, on the basis of the acquired first state data, the arithmetic model being generated by machine learning based on at least one of second state data indicating a state in which a second target person different from the first target person has used the functional element in a past and the first state data saved in a past; and causing a presentation unit to present the information on the functional element on the basis of the acquired estimation data.

An information processing apparatus according to an embodiment of the present invention is an information processing apparatus including at least one processor that executes a program stored in a storage unit, wherein the at least one processor is operative to:

acquire first state data indicating a state in which a first target person has used a functional element realized by execution of a target program;

acquire estimation data for estimating information on the functional element matched to the first target person, in accordance with an arithmetic model, on the basis of the acquired first state data, the arithmetic model being generated by machine learning based on at least one of second state data indicating a state in which a second target person different from the first target person has used the functional element in a past and the first state data saved in a past; and cause a presentation unit to present the information on the functional element on the basis of the acquired estimation data.

BRIEF DESCRIPTION OF THE DRAWINGS

FIG. 10 shows a specific example of how the tutorial to be presented is determined;

DETAILED DESCRIPTION

Figure 1:
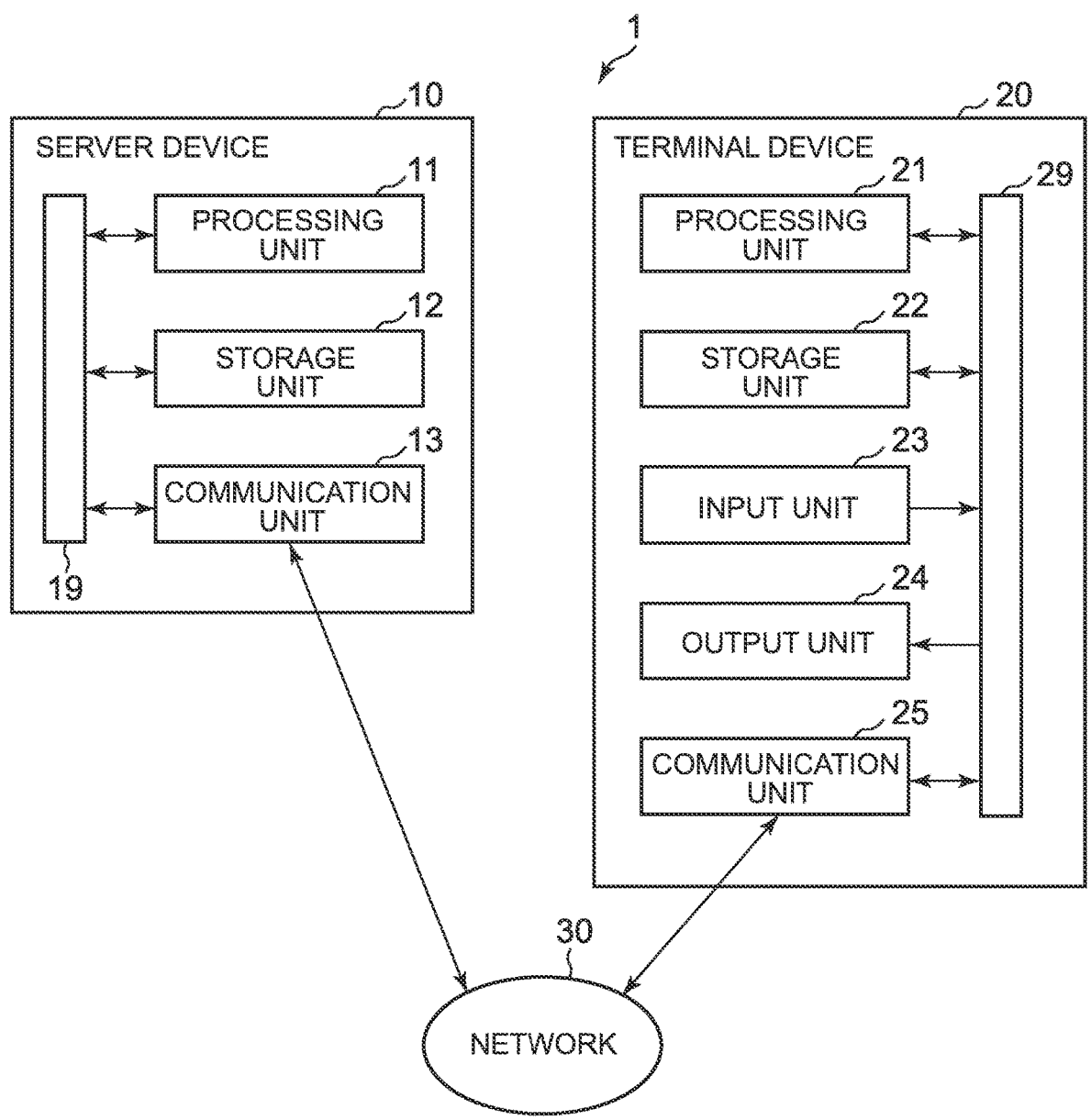
FIG. 1 shows an exemplary configuration of an information processing system.

Embodiments of the present invention will be described in detail below with reference to the drawings. Throughout the drawings, the same or corresponding parts are denoted by the same reference numerals.

FIG. 1 shows an exemplary configuration of an information processing system 1 according to an embodiment of the present invention. The information processing system 1 includes a server device 10 and a terminal device 20. The server device 10 and the terminal device 20 are connected to each other via a network 30 in a manner capable of telecommunication. The network 30 may be any telecommunication network, such as the Internet, a wireless local area network (LAN), a wired LAN, a mobile communication network, a short-distance wireless communication network, or a combination of some or all of the above. Although only one terminal device 20 is shown in FIG. 1, the number of terminal devices 20 that can be connected to the server device 10 via the network 30 is not limited to this, and a plurality of terminal devices 20 may be connected.

The information processing system 1 is a system capable of providing information processing services using a plurality of types of functional elements, including functional elements related to various calculations and functional elements related to drawing. For example, the information processing system 1 may be capable of displaying calculated values that are the results of calculations based on mathematical expressions entered by a user, displaying graphs of functions according to the results of function calculations based on functions, drawing and displaying figures based on angles and edge lengths, displaying numerical sequence tables and graphs according to the results of numerical sequence calculations based on first terms and recurrence relations, displaying statistical graphs and statistical values according to the results of statistical calculations based on numerical values, and/or displaying mathematical tables of profits and total principal and interest according to the results of financial calculations based on the amount of investment, annual interest, and the number of days.

In the information processing system 1, data and calculation instructions input to the terminal device 20 are sent from the terminal device 20 to the server device 10. The server device 10 executes calculations on the basis of the data and calculation instructions received from the terminal device 20, and sends the calculation results to the terminal device 20. The terminal device 20 can use the calculation results received from the server device 10 to perform display according thereto, for example, display of a graph, display of a mathematical table, display of numerical values as the calculation results, and so on. As such, the information processing system 1 is configured to be able to provide the information processing results according to the data and calculation instructions input by the user using the terminal device 20.

The server device 10 is an information processing apparatus, also called a host computer, mainframe, or workstation, and includes a processing unit 11, a storage unit 12, and a communication unit 13. These components are connected to each other via a system bus 19.

The processing unit 11 is configured to include a processor such as a central processing unit (CPU), and controls various operations of the server device 10. The processor of the processing unit 11 is not limited to the CPU, and for example, an application specific integrated circuit (ASIC), a field programmable gate array (FPGA), or the like may be used. The storage unit 12 is configured using a read only memory (ROM), random access memory (RAM), hard disk drive (HDD), flash memory, or other storage device, and stores various programs and data. The processing unit 11 reads a calculation program stored in the storage unit 12 to execute various calculations. The communication unit 13 is configured to include a network interface card (NIC) and the like, and accesses the network 30 to perform telecommunications with external devices.

The terminal device 20 may be any of an information processing apparatus such as a personal computer, a portable terminal device such as a tablet, and a mobile communication device such as a smartphone, and includes a processing unit 21, a storage unit 22, an input unit 23, an output unit 24, and a communication unit 25. These components are connected to each other via a system bus 29.

The processing unit 21 is configured to include a processor such as a CPU, and controls various operations of the terminal device 20. The storage unit 22 is configured using a storage device, and stores various programs and data. The processing unit 21 reads application programs, including a browser program, stored in the storage unit 22, and executes the control of input/output and communication with the server device 10. The program to be executed by the processing unit 21 may be downloaded from a web server to the storage unit 22 via the network 30 and the communication unit 25. The input unit 23 includes a manipulation input device such as a keyboard, touch panel or the like, or an audio input device such as a microphone or the like. With a manipulation input using the keyboard or touch panel of the input unit 23, detection signals are input to the processing unit 21 via the system bus 29. The output unit 24 includes a display output device such as a liquid crystal display or the like, or an audio output device such as a speaker or the like. Output control signals from the processing unit 21 are transmitted via the system bus 29, and the output unit 24 performs various outputs. The output unit 24 of the terminal device 20 thus serves as a presentation unit that presents various information to the user by means of display output or audio output. The communication unit 25 is configured to include at least one of a wired communication module and a wireless communication module, such as a NIC, and accesses the network 30 to perform telecommunications with external devices.

A user of the terminal device 20, with manipulation inputs to the input unit 23, starts an application program that is a browser program or an application program that is other than the browser program, and instructs an access to the server device 10. The terminal device 20, in response to acceptance of inputs of mathematical expressions, numerical values, and the like, issues a request to the server device 10, and receives, as a response from the server device 10, the results of the calculations performed by the server device 10 in accordance with the program. As such, when receiving a request for calculation from the terminal device 20, the server device 10 executes the calculations by the processing unit 11 in accordance with the program, and sends the result of the executed calculations to the terminal device 20 as a response. The terminal device 20 then uses the received calculation results to draw function graphs or statistical graphs, or display the calculation results, using the application program. Thus, in the information processing system 1, the execution of the application program in the terminal device 20 and the execution of the server-side program in the server device 10 realize the functional elements of the information processing services that enable drawing of graphs, display of calculation results, and so on. The processing unit 11 of the server device 10 may be capable of executing a plurality of types of target programs in response to a plurality of types of requests sent from the terminal device 20.

Figure 2:
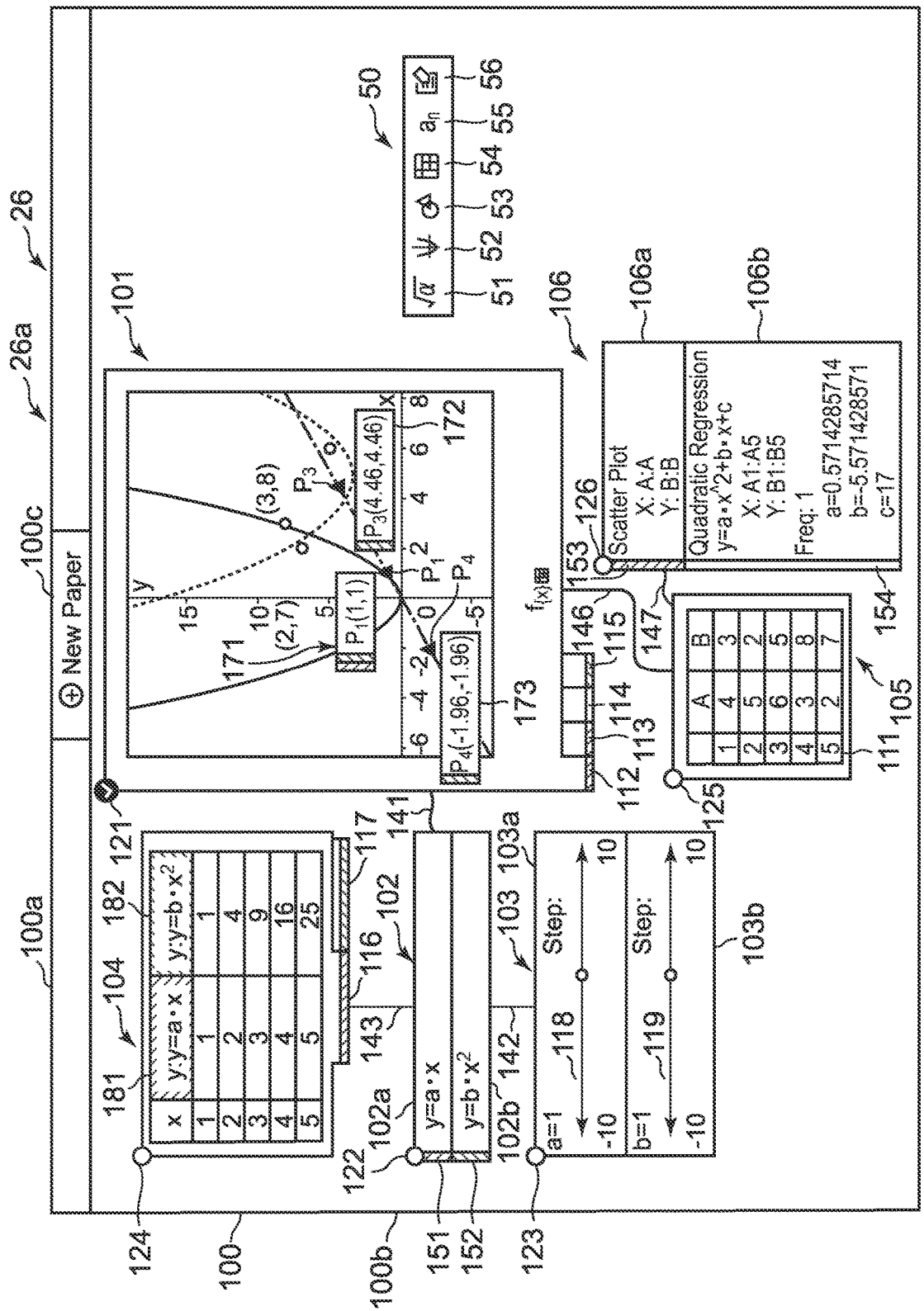
FIG. 2 shows an example of screen display.

FIG. 2 shows an example of a screen display 26 by the application program executed by the terminal device 20. The terminal device 20 enables a liquid crystal display of the output unit 24, for example, to present the screen display 26 as shown in FIG. 2 by display output.

A screen frame 26a, which constitutes the screen display 26 shown in FIG. 2, is divided into an upper area 100a and a lower area 100b. The upper area 100a is an elongated area in which a new paper create icon 100c is displayed. The lower area 100b is the area lower than the upper area 100a in the screen frame 26a, and is also called paper 100. Various floating objects are displayed on the paper 100. The floating objects are objects (displays) that are displayed on the screen. The displays have their display positions at least changeable in units of one or more objects in response to a user manipulation. Each object is called a tag (e.g., sticky note).

The paper 100 shown in FIG. 2 displays a graph tag 101, a mathematical expression tag 102, a slider tag 103, a formula-use mathematical table tag 104, a statistics-use mathematical table tag 105, and a statistical calculation tag 106. The paper 100 may be capable of displaying a plurality of types of tags including, besides the above, a general calculation tag, a geometry tag, a numerical sequence calculation tag, a financial calculation tag, and a text tag. Each tag has a checkbox 121-126 displayed in the upper left corner. For example, when a tag is selected, a check mark is displayed in the checkbox of that tag.

The graph tag 101 can display function graphs and statistical graphs. The graph tag 101 includes a first mathematical expression graph, which is a graph of a mathematical expression input to a first mathematical expression tag 102a, a second mathematical expression graph, which is a graph of a mathematical expression input to a second mathematical expression tag 102b, a first statistical graph, which is a scatter plot created on the basis of numerical values input to the statistics-use mathematical table tag 105, and a second statistical graph, which is a quadratic regression graph created on the basis of numerical values input to the statistics-use mathematical table tag 105. These graphs are drawn superimposed on one another.

In the lower left of the graph tag 101, first through fourth tabs 112 to 115 are displayed. The first tab 112 is associated with the first statistical graph, the second tab 113 is associated with the second statistical graph, the third tab 114 is associated with the first statistical graph, and the fourth tab 115 is associated with the second statistical graph. The graph tag 101 have coordinate value labels 171 to 173 displayed thereon. The coordinate value label 171 displays the coordinates of a point P1, the coordinate value label 172 displays the coordinates of a point P3, and the coordinate value label 173 displays the coordinates of a point P4.

The mathematical expression tag 102 can display functions that are mathematical expressions, in response to input manipulations in the input unit 23. In the mathematical expression tag 102, the first mathematical expression tag 102a and the second mathematical expression tag 102b are displayed vertically connected. The first mathematical expression tag 102a has a tab 151 displayed therein, and the second mathematical expression tag 102b has a tab 152 displayed therein.

In the case where the mathematical expression input to the mathematical expression tag 102 contains a character coefficient, the slider tag 103 displays the value of the character coefficient in a changeable manner. In the slider tag 103, a first slider tag 103a including a first slider 118 and a second slider tag 103b including a second slider 119 are displayed vertically connected. The first slider 118 changes the value of the character coefficient contained in the mathematical expression displayed in the first mathematical expression tag 102a in response to the input manipulation, and the display of the first statistical graph is updated according to the character coefficient value. The second slider 119 changes the value of the character coefficient contained in the mathematical expression displayed in the second mathematical expression tag 102b in response to the input manipulation, and the display of the second statistical graph is updated according to the character coefficient value.

The formula-use mathematical table tag 104 can display variable values contained in the mathematical expressions input to the mathematical expression tag 102 in the form of mathematical table. The formula-use mathematical table tag 104 displays the variable value in the mathematical expression displayed in the first mathematical expression tag 102a and the variable value in the mathematical expression displayed in the second mathematical expression tag 102b. The formula-use mathematical table tag 104 has tabs 116 and 117 displayed at the bottom. The tab 116 is associated with the variable value in the mathematical expression displayed in the first mathematical expression tag 102a, and the tab 117 is associated with the variable value in the mathematical expression displayed in the second mathematical expression tag 102b.

In the first row of the mathematical table displayed in the formula-use mathematical table tag 104, in cells 181 and 182, the mathematical expressions corresponding to the variable values displayed in the respective columns are displayed as the column item names. The cell 181 shows the mathematical expression displayed in the first mathematical expression tag 102a, and the cell 182 shows the mathematical expression displayed in the second mathematical expression tag 102b.

The statistics-use mathematical table tag 105 can display, in the form of mathematical table, numerical values input to a mathematical table 111 in response to input manipulations in the input unit 23. The statistical calculation tag 106 can display information on statistical calculations. In the statistical calculation tag 106, a first statistical calculation tag 106a and a second statistical calculation tag 106b are displayed vertically connected. The first statistical calculation tag 106a has a tab 153 displayed therein, and the second statistical calculation tag 106b has a tab 154 displayed therein.

The first statistical calculation tag 106a displays information on the first statistical graph, which is the scatter plot drawn in the graph tag 101. The display of the first statistical calculation tag 106a includes character strings indicating statistical calculations related to the scatter plot and character strings indicating the target values for the statistical calculations. The second statistical calculation tag 106b displays information on the second statistical graph, which is the quadratic regression graph drawn in the graph tag 101. The display of the second statistical calculation tag 106b includes character strings indicating statistical calculations related to the quadratic regression graph, character strings indicating the quadratic regression equation, character strings indicating the target values for the statistical calculations, character strings indicating the frequency of each value, and character strings indicating the coefficient values of the quadratic regression equation.

Besides the above, the general calculation tag can display computational expressions and calculations results in response to input manipulations in the input unit 23. The geometry tag can display triangles, circles, cones, and other figures in response to input manipulations in the input unit 23. The numerical sequence calculation tag can display the first terms, recurrence relations, and numerical sequence tables in response to input manipulations in the input unit 23. The numerical sequence tables may be displayed as a different tag from the numerical sequence calculation tag. The text tag can display text input information in response to input manipulations in the input unit 23.

The paper 100 shown in FIG. 2 displays connection lines 141 to 143 and connection lines 146 and 147. The connection line 141 indicates that the graph tag 101 is linked to the mathematical expression tag 102, the connection line 142 indicates that the mathematical expression tag 102 is linked to the slider tag 103, and the connection line 143 indicates that the mathematical expression tag 102 is linked to the formula-use mathematical table tag 104. The connection line 146 indicates that the graph tag 101 is linked to the statistics-use mathematical table tag 105, and the connection line 147 indicates that the statistics-use mathematical table tag 105 is linked to the statistical calculation tag 106.

The paper 100 shown in FIG. 2 displays a menu icon bar 50. The menu icon bar 50 is configured to include a plurality of icons that accept input manipulations for displaying new tags. The menu icon bar 50 is displayed in an area in the paper 100 where no object is placed, at a specific position where the input manipulation by the user has been accepted. The menu icon bar 50, as with the other tags, is displayed as a floating object.

The menu icon bar 50 includes a general calculation icon 51, a graph icon 52, a geometry icon 53, a statistics-use mathematical table icon 54, a numerical sequence calculation icon 55, and a text icon 56. The general calculation icon 51 accepts an input manipulation to display a new general calculation tag, the graph icon 52 accepts an input manipulation to display a new graph tag, the geometry icon 53 accepts an input manipulation to display a new geometry tag, the statistics-use mathematical table icon 54 accepts an input manipulation to display a new statistics-use mathematical table tag, the numerical sequence calculation icon 55 accepts an input manipulation to display a new numerical sequence calculation tag, and the text icon 56 accepts an input manipulation to display a new text tag. Besides the above, the menu icon bar 50 may include a financial calculation icon that accepts an input manipulation to display a new financial calculation tag.

In the graph tag 101 shown in FIG. 2, an icon group is displayed. The icon group includes a mathematical expression icon and a statistics-use mathematical table icon. The mathematical expression icon in the icon group accepts an input manipulation to create a new mathematical expression tag linked to the graph tag 101 or an input manipulation to move the focus to an existing mathematical expression tag linked to the graph tag 101. The statistics-use mathematical table icon in the icon group accepts an input manipulation to create a new statistics-use mathematical table tag linked to the graph tag 101 or an input manipulation to move the focus to an existing statistics-use mathematical table tag linked to the graph tag 101.

The information processing system 1 has a plurality of types of functional elements capable of presenting information obtained by various information processing to the user, which include: a functional element that creates various tags starting from a blank sheet of paper 100 and displays the results of calculations performed; a functional element that draws a function graph or a statistical graph on a graph tag 101; a functional element that displays the coordinate values of any point on the drawn graph; a functional element that displays the calculation results of calculations performed using the coordinate values; a functional element that draws figures on a geometry tag; and a functional element that inputs numerical values on a formula-use mathematical table tag or a statistics-use mathematical table tag and displays them. These plurality of types of functional elements are realized by the execution of target programs in the processing unit 11 of the server device 10.

In the screen display 26 of the paper 100, tutorials can be displayed as part of the information on the functional elements provided to the user. The tutorial presents information on the way of use for each tag, for example, as information according to the actual creation procedure or execution procedure. Tutorials of different contents may be prepared for different types of tags or for different usage levels of users or the like. The tutorials are presented to support the user's use of the information processing services, and serve as support information showing the way of use corresponding to the plurality of types of functional elements that the information processing services can provide. In the paper 100, a tutorial may be made displayable in an area where no objects are placed. Alternatively, a tutorial can be made displayable overlaid in an area where objects have been placed. A plurality of tutorials can be displayed side by side or stacked on top of one another. As such, in the information processing system 1, tutorials that serve as support information can be presented by display output in the screen display 26 of the paper 100 as information corresponding to individual tags that provide a plurality of types of functional elements.

Figure 3:
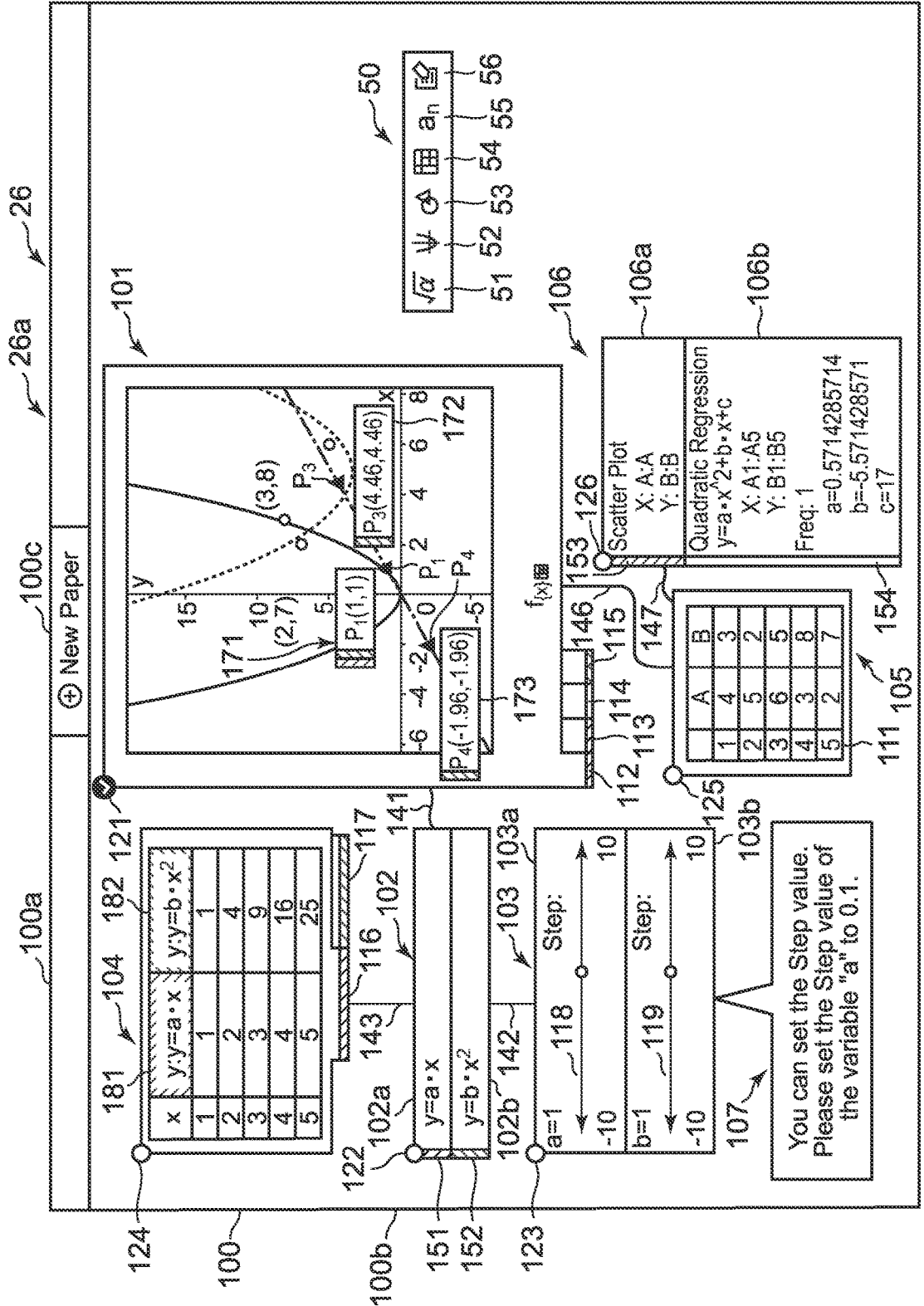
FIG. 3 shows an exemplary display of a tutorial.

FIG. 3 shows an exemplary display of a tutorial 107 in the screen display 26 of the paper 100. The tutorial 107 is presented as support information showing the way of use corresponding to the slider tag 103. In the screen display 26 of the paper 100, the tutorial 107 is displayed in the area below the slider tag 103 where no object is placed. Not limited to the slider tag 103, tutorials 107 with different contents may be able to be displayed corresponding respectively to the graph tag 101, the mathematical expression tag 102, the formula-use mathematical table tag 104, the statistics-use mathematical table tag 105, and the statistical calculation tag 106. Besides the above, tutorials 107 with different contents may be able to be presented by display output corresponding to all or some of the tags that can be provided by display output in the information processing services, such as the general calculation tag, geometry tag, numerical sequence calculation tag, financial calculation tag, text tag, and so on. It may also be possible to present tutorials 107 with different contents by display output corresponding to the individual icons 51 to 56 of the menu icon bar 50. As such, the tutorial 107 is the support information that shows the way of use corresponding to a plurality of types of functional elements, such as a plurality of types of tags, and is included in the information on the functional elements.

The tutorial 107 may be started to be displayed on the basis of an input manipulation corresponding to a start request by a user. Alternatively, the display of the tutorial 107 may be automatically started in accordance with an initial setting of the information processing services. An optional setting based on input manipulations by the user may make it possible to selectively switch between the case where the display of the tutorial 107 is automatically started, the case where the display of the tutorial 107 is manually started, the case where the display of the tutorial 107 is not started, and so on. The tutorial 107 may be erased on the basis of an input manipulation by the user in accordance with its contents. Alternatively, a display area that serves as an erase button may be provided in the tutorial 107, and the tutorial may be erased on the basis of the input manipulation on the erase button by the user. A plurality of tutorials 107 may be prepared, and upon detection of an input manipulation according to the content indicated by a first tutorial, the display of the first tutorial may be erased and the display of a second tutorial indicating a new content may be started.

In the information processing system 1, for a user to use the information processing services, the user's ID and password are sent from the terminal device 20 to the server device 10. The user's ID and password are uniquely assigned in advance by the information processing services, and may be stored in the storage unit 22 of the terminal device 20 or entered by the input manipulation on the input unit 23. The server device 10 executes the user authentication process, and when the login is permitted, the terminal device 20 displays the My Page screen. For example, the output unit 24 of the terminal device 20 may be able to display the My Page screen using a liquid crystal display or the like.

Figure 4:
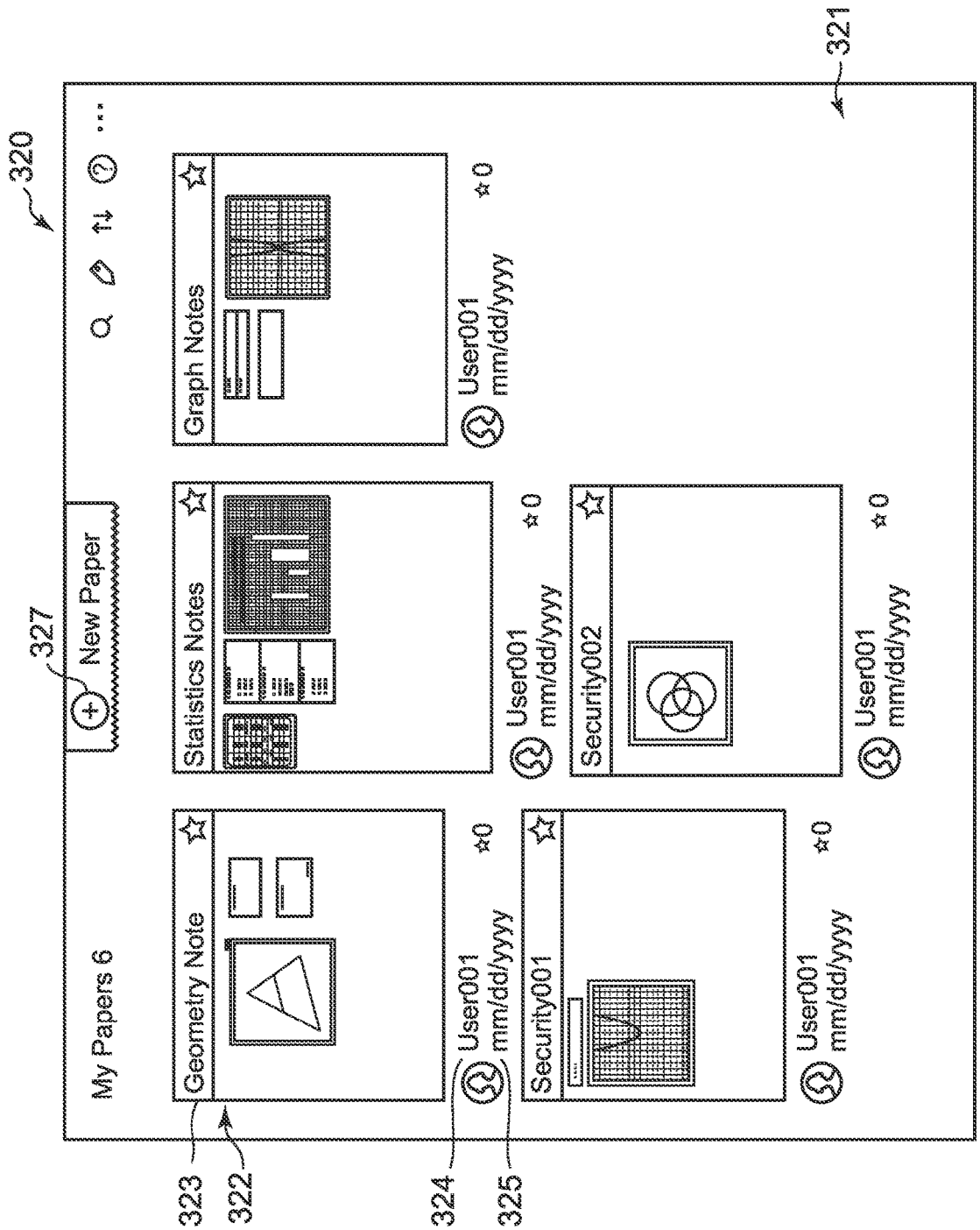
FIG. 4 shows an example of a My Page screen.

FIG. 4 shows an example of a My Page screen 320 displayed on the terminal device 20. The My Page screen 320 includes a thumbnail image group 321. The thumbnail image group 321 includes a plurality of thumbnail images 322. Each thumbnail image 322 shows a paper 100 that has been created by the user. Each thumbnail image 322 may include a title 323 of the paper, its creator 324, its update date and time 325, and so on.

The My Page screen 320 is capable of accepting various input manipulations by the user. The information indicating the user input manipulations is sent out from the terminal device 20, from the input unit 23 through the processing unit 21 and the communication unit 25, and is transmitted to the server device 10 through the network 30. For example, when a new paper 100 is to be created, a create icon 327 is selected. When the paper 100 that has already been created is to be updated, the thumbnail image 322 corresponding to the paper 100 is selected. When a new paper 100 is to be created, paper data is newly created by the processing unit 11 in the server device 10. When the paper 100 that has already been created is to be updated, the paper data is updated by the processing unit 11 in the server device 10. The My Page screen 320 may include, in addition to the list display area in which the thumbnail image group 321 is displayed and the header area in which the create icon 327 is displayed, a side menu area in which menu items corresponding to the switching of various displays are displayed.

Figure 5:
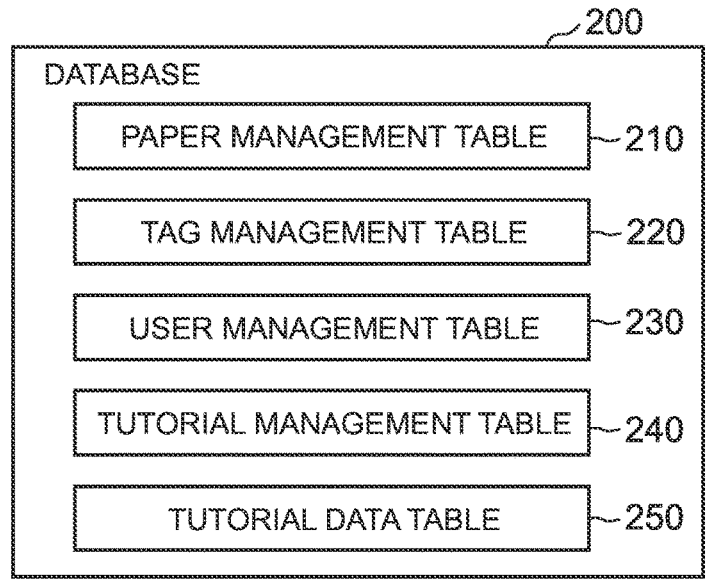
FIG. 5 shows an exemplary configuration of a database.

FIG. 5 shows an exemplary configuration of the database 200. The database 200 is provided in a storage of the storage unit 12 included in the server device 10. The database 200 includes a paper management table 210, a tag management table 220, a user management table 230, a tutorial management table 240, and a tutorial data table 250.

The paper management table 210 holds information such as a data ID, a user ID, a paper ID, paper disclosure setting, a uniform resource locator (URL) for publication, etc. for each paper 100 created by a user. The data indicating the information held in the paper management table 210 is also referred to as paper management data. When a new paper 100 is created, one new row of paper management data is added in the paper management table 210. The data ID is unique identification information assigned to each paper management data. The user ID is identification information of the user who created the paper 100. The paper ID is identification information assigned to each paper 100. The paper disclosure setting is information that indicates whether the corresponding paper 100 is to be made public, "public", or kept private, "private". The URL for publication is the address information assigned to the corresponding paper 100 when the paper's disclosure setting is "public". The paper management data may also include image data indicating a thumbnail image of the paper 100. The thumbnail image of the paper 100 may be one created by capturing the screen data of the paper 100 as a captured image.

The tag management table 220 holds information such as a tag ID, a paper ID, a tag type, a tag content, etc. for each object that becomes a tag created by a user. The data indicating the information held in the tag management table 220 is also referred to as tag management data. When a new tag is created, one new row of tag management data is added in the tag management table 220. The tag ID is unique identification information assigned to the tag management data corresponding to each tag. The paper ID is identification information of the paper 100 on which each tag is displayed, and corresponds to the paper ID contained in the paper management data held in the paper management table 210. The tag type is information that indicates the type of each tag, such as general calculation tag, graph tag, mathematical expression tag, slider tag, formula-use mathematical table tag, geometry tag, statistics-use mathematical table tag, statistical calculation tag, financial calculation tag, and text tag. The tag content, indicating the contents of the tag, is information that shows a character string, mathematical expression, image, and so on in an identifiable manner. The tag content may also include information on the display settings, such as display position, display size, and display color, for each tag in the paper 100.

The user management table 230 holds information such as a user ID, a user name, an email address, a user type, an age, a gender, a location, a usage level, etc. for each user who uses the information processing services provided by the information processing system 1. The data indicating the information held in the user management table 230 is also referred to as user management data. When a new user is registered, one new row of user management data is added in the user management table 230. The user ID is unique identification information assigned to the user management data corresponding to each user. The user name is information that indicates the name of the registered user. The email address is the address information of the email used by the registered user. The user type, age, gender, and location are attribute information corresponding to each user. Among them, the user type is the attribute information corresponding to the user's status or ability, such as student or teacher, organization or department to which the user belongs, field of expertise of the user, and so on. The location may be positional information that can be set for each user, such as the name of the country or region, postal code, other address code, or street address, which indicates at least one of the user's address, residence, current location, or the address or residence of the organization to which the user belongs. The usage level may be characteristic information that indicates the number of times or the time for which each user has used the information processing services, the level of difficulty or proficiency attained, or the like. The user management data may also include log information that indicates the history of each user's use of the plurality of types of functional elements in the information processing services.

The tutorial management table 240 holds information such as a tutorial ID, a tag type, a usage level, a level of detail, etc. for each tutorial that can be provided on the screen display 26 of the paper 100, such as the tutorial 107 shown in FIG. 3. The data indicating the information held in the tutorial management table 240 is also referred to as tutorial management data. The tutorial management data may be created in advance in the inside of the information processing system 1 or by an external device and stored in a storage of the storage unit 22 as the tutorial management table 240. When new tutorial management data is created by an administrator of the information processing system 1 or the like, the tutorial management table 240 may be updated to add the new data. The tutorial ID is identification information assigned to the individual tutorial management data. The tag type is information that indicates which type of the tag for which the tutorial is to be displayed, among the general calculation tag, graph tag, mathematical expression tag, slider tag, formula-use mathematical table tag, geometry tag, statistics-use mathematical table tag, statistical calculation tag, financial calculation tag, and text tag. The usage level is information that indicates the usage level of the user to whom the tutorial is to be displayed. The level of detail is information that indicates the degree of detail in the content of the tutorial.

The tutorial data table 250 stores information on the specific contents of tutorials. The tutorial data table 250 holds information such as a tutorial ID, a data content, etc. for each tutorial. The tutorial ID corresponds to the one managed in the tutorial management table 240. The data content, indicating the contents of the tutorial, is information that shows a character string, mathematical expression, image, and so on in an identifiable manner.

Figure 6:
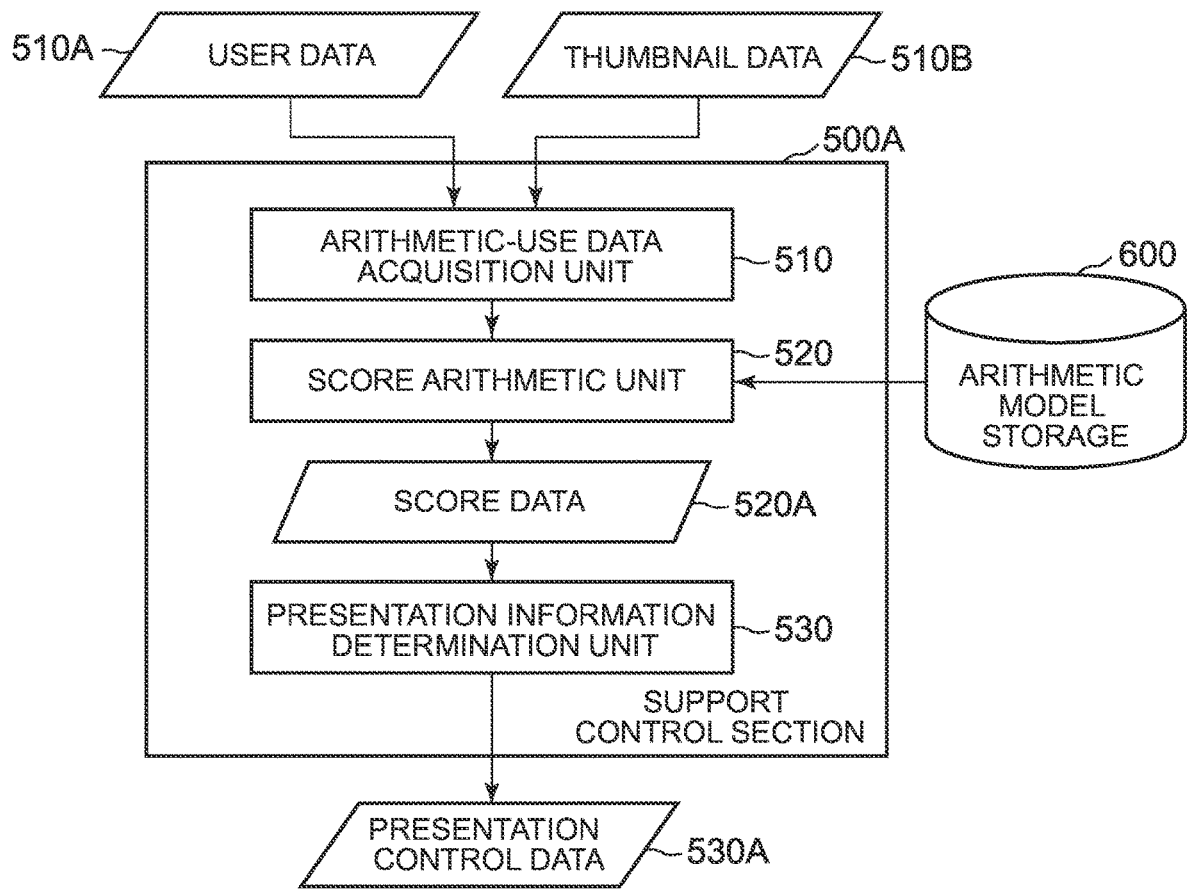
FIG. 6 shows an exemplary configuration of a support control section.

FIG. 6 shows an exemplary configuration of a support control section 500A configured in the server device 10. The support control section 500A may be one in which information processing by software is implemented using hardware resources, by a processor or the like of the processing unit 11 reading and executing a program stored in advance in a storage of the storage unit 12. In the case of presenting a tutorial for supporting the use of the information processing services to a user who is a target of the support, the support control section 500A estimates and enables the presentation of a tutorial that is matched to that user. The user who is the target of the support is, for example, the user who has performed the input manipulation to start the screen display 26 of the paper 100. Any user who uses the information processing services can be the target of the support. In the following, the user in the scene where a tutorial is to be presented for support may also be particularly called a first target person, and the user in other situations may also be called a second target person who is different from the first target person, and a description may be given distinguishing between the two.

The support control section 500A shown in FIG. 6 includes an arithmetic-use data acquisition unit 510, a score arithmetic unit 520, and a presentation information determination unit 530. The processing unit 11 of the server device 10 reads and executes a program stored in a storage of the storage unit 12 or the like to implement a first acquisition function by the arithmetic-use data acquisition unit 510, a second acquisition function by the score arithmetic unit 520, and a presentation processing function by the presentation information determination unit 530. That is, the storage unit 12 of the server device 10 stores a program for causing the processing unit 11 of the server device 10 as a computer to implement the first acquisition function by the arithmetic-use data acquisition unit 510, the second acquisition function by the score arithmetic unit 520, and the presentation processing function by the presentation information determination unit 530.

The arithmetic-use data acquisition unit 510 acquires, as data for arithmetic operations, various data used for arithmetic processing in the process of estimating the information on a functional element matched to a user, such as in the case of presenting a tutorial by display output in the output unit 24 of the terminal device 20. The user for whom the estimation is to be made by the arithmetic processing using the data for arithmetic operations is also the user to whom a tutorial is to be presented for supporting the use of the information processing services, and is the support target as the first target person. The data for arithmetic operations includes user data 510A and thumbnail data 510B. The user data 510A is data related to a user who is the first target person to be supported by presenting a tutorial, among a plurality of users who use the information processing services provided by the information processing system 1. The user data 510A may include part or all of the user management data held in the user management table 230 corresponding to the user who is the first target person. For example, as the user data 510A, attribute data indicating the user's attribute information, such as user type, gender, age, and location information contained in the user management data, or information as a combination of some or all of them, may be used. As the user data 510A, characteristic data that indicates the user's characteristic information, such as the usage level contained in the user management data, may also be used. The thumbnail data 510B may be image data (data represented by pixel values) that indicates the thumbnail image 322 selected by the user who is the first target person in the My Page screen 320. In the case where the creation of a new paper is selected in the screen display 26 of the paper 100 or the My Page screen 320, image data indicating a new thumbnail image 322 may be acquired as the thumbnail data 510B. The new thumbnail image 322 may show only a display area that serves as the background of the paper 100, and may include no display area corresponding to tags. As the image data indicating the thumbnail image 322 selected in the My Page screen 320 is used as the thumbnail data 510B, the thumbnail data 510B corresponds to first state data that indicates the state in which the user, who is the first target person, has used the tag corresponding to a functional element in the information processing services provided by the information processing system 1. As such, the arithmetic-use data acquisition unit 510 implements the first acquisition function (first acquisition means) to acquire the first state data indicating the state in which the first target person has used a functional element that is realized by execution of a target program in the processing unit 11 or the like of the server device 10. Further, the arithmetic-use data acquisition unit 510 implements the first acquisition function to acquire attribute data indicating a combination of some or all of gender, age, and location of the first target person.

The score arithmetic unit 520 performs arithmetic processing according to an arithmetic model as a learned model generated by machine learning, on the basis of the data for arithmetic operations acquired by the arithmetic-use data acquisition unit 510. The arithmetic model may be a learned model, with the user data 510A and the thumbnail data 510B included in the data for arithmetic operations being input, machine-learned so as to output score data 520A for estimating the information on a tag that is matched to the user. The model may be a neural network model, for example. The score arithmetic unit 520 may acquire an arithmetic model from, for example, an arithmetic model storage 600 provided in the storage unit 12 or the like of the server device 10, and perform arithmetic processing according to the arithmetic model. The arithmetic model may be held in the arithmetic model storage 600 by storing in advance the arithmetic model generated by machine learning. The arithmetic model storage 600 is not limited to one provided in the storage unit 12 of the server device 10; it may be provided, for example, in a storage unit or the like of a computer that is different from the server device 10.

Figure 7:
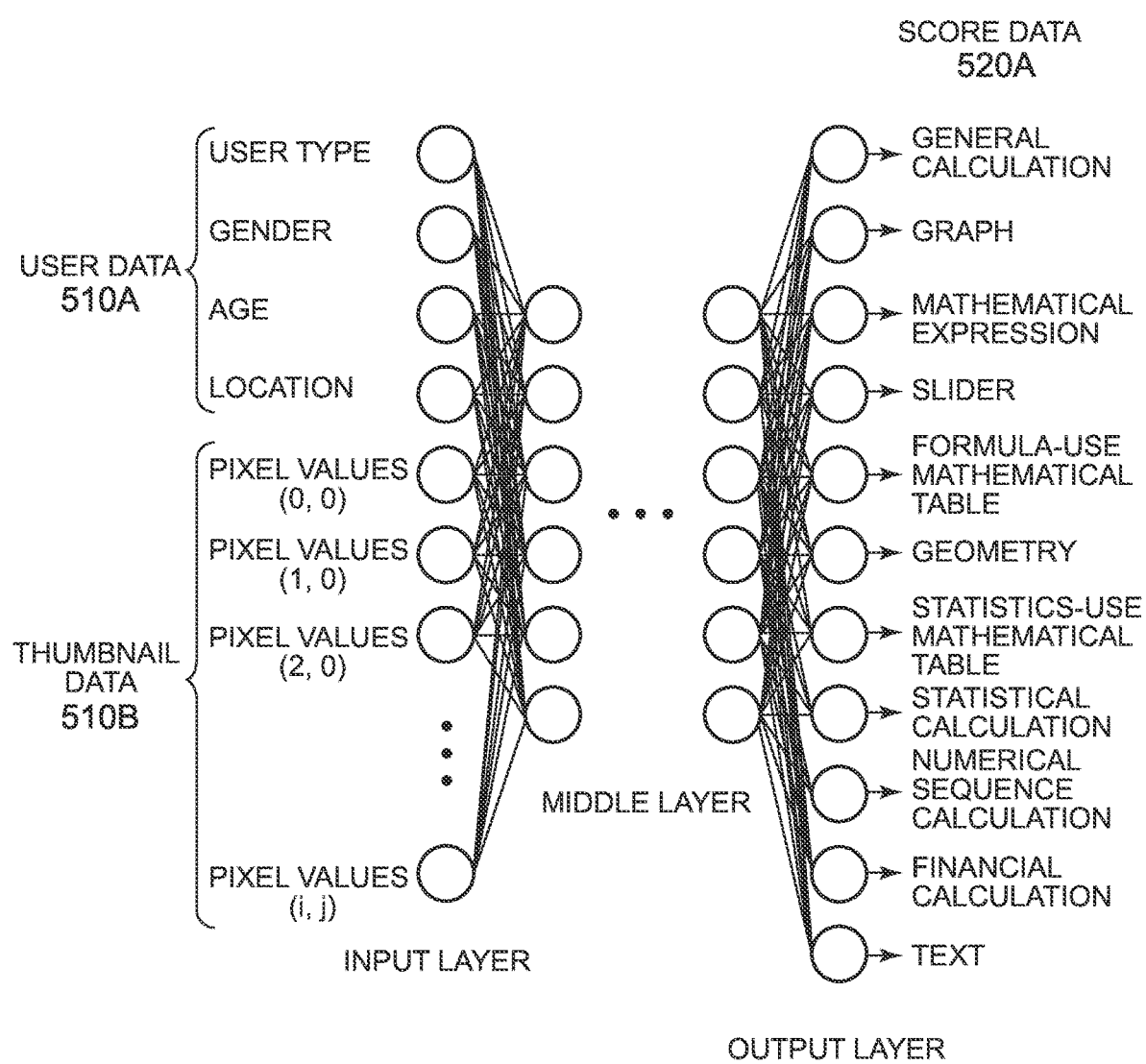
FIG. 7 shows an exemplary configuration of a neural network model.

FIG. 7 shows an exemplary configuration of a neural network model. The neural network is configured to include an input layer, a middle layer, and an output layer. The middle layer is also called the hidden layer. The input layer, the middle layer, and the output layer each contain a plurality of neurons. The number of middle layers may be only one or two or more, which can be set as appropriate in accordance with specifications such as computational resources or estimation accuracy. The input layer contains neurons to which user data 510A is input, and neurons to which thumbnail data 510B is input. The output layer contains a plurality of neurons that output score data 520A used for estimating tutorials, which are the information on tags matched to a user, corresponding to the respective types of tags of general calculation tag, graph tag, mathematical expression tag, slider tag, formula-use mathematical table tag, geometry tag, statistics-use mathematical table tag, statistical calculation tag, numerical sequence calculation tag, financial calculation tag, and text tag. The score arithmetic unit 520, by executing arithmetic processing according to the neural network model shown in FIG. 7, implements the second acquisition function to acquire estimation data for estimating the information on the functional elements matched to the first target person, in accordance with the arithmetic model generated by machine learning, on the basis of the first state data.

The presentation information determination unit 530 determines a tutorial as information that is to be presented by the terminal device 20 to the user by means of display output in the output unit 24 in the information processing services, on the basis of the score data 520A as the results of arithmetic operations by the score arithmetic unit 520. For example, for a tag type with a large score value in the score data 520A output from the score arithmetic unit 520, it is inferred that the user is familiar with the tag type, because the user has created and used the tag many times. On the other hand, for a tag type with a small score value in the score data 520A output from the score arithmetic unit 520, it is inferred that the user is not familiar with the tag type, because the number of times the user has created and used the tag is small. Therefore, the information to be presented to the user as a tutorial may be determined such that the tutorial to be presented for the tag type with a large score value is simpler in content than the tutorial to be presented for the tag type with a small score value. The arithmetic model used in the arithmetic processing of the score arithmetic unit 520 may be generated by machine learning, so that score data 520A indicating score values adapted to the data for arithmetic operations can be obtained as the score data 520A having such a relationship, on the basis of the data for arithmetic operations acquired by the arithmetic-use data acquisition unit 510. The score data 520A, as the results of the arithmetic operations by the score arithmetic unit 520, corresponds to the estimation data for estimating the information on the functional elements matched to the user in the information processing services provided by the information processing system 1. On the basis of the score data 520A output from the score arithmetic unit 520, the presentation information determination unit 530 determines the information on the functional elements to be presented to the user, such as the tutorials that serve as the support information.

The presentation information determination unit 530 generates presentation control data 530A that is used for controlling the presentation of the determined information.

The presentation control data 530A may include, for example, data contents acquired from the tutorial data table 250 on the basis of information on the tutorial IDs held in the tutorial management table 240. The presentation control data 530A may also include display position information indicating the display positions of the tutorials on the screen display 26 of the paper 100. The presentation control data 530A generated by the presentation information determination unit 530 is transmitted from the communication unit 13 to the terminal device 20 via the network 30. The processing unit 21 in the terminal device 20 may update the display output on the display output device of the output unit 24, on the basis of the presentation control data 530A received from the server device 10, to thereby be able to present the information on the functional elements matched to the user, such as tutorials that serve as support information, regarding the plurality of types of functional elements provided in the information processing services. Supplying the presentation control data 530A generated by the presentation information determination unit 530 to the terminal device 20 in this manner implements the presentation processing function (presentation processing means) to present the information on the functional elements matched to the user in the information processing services by means of display output or the like in the output unit 24 of the terminal device 20. The information on the functional elements may be support information that shows the way of use corresponding to the plurality of types of functional elements.

Figures 8, 9:
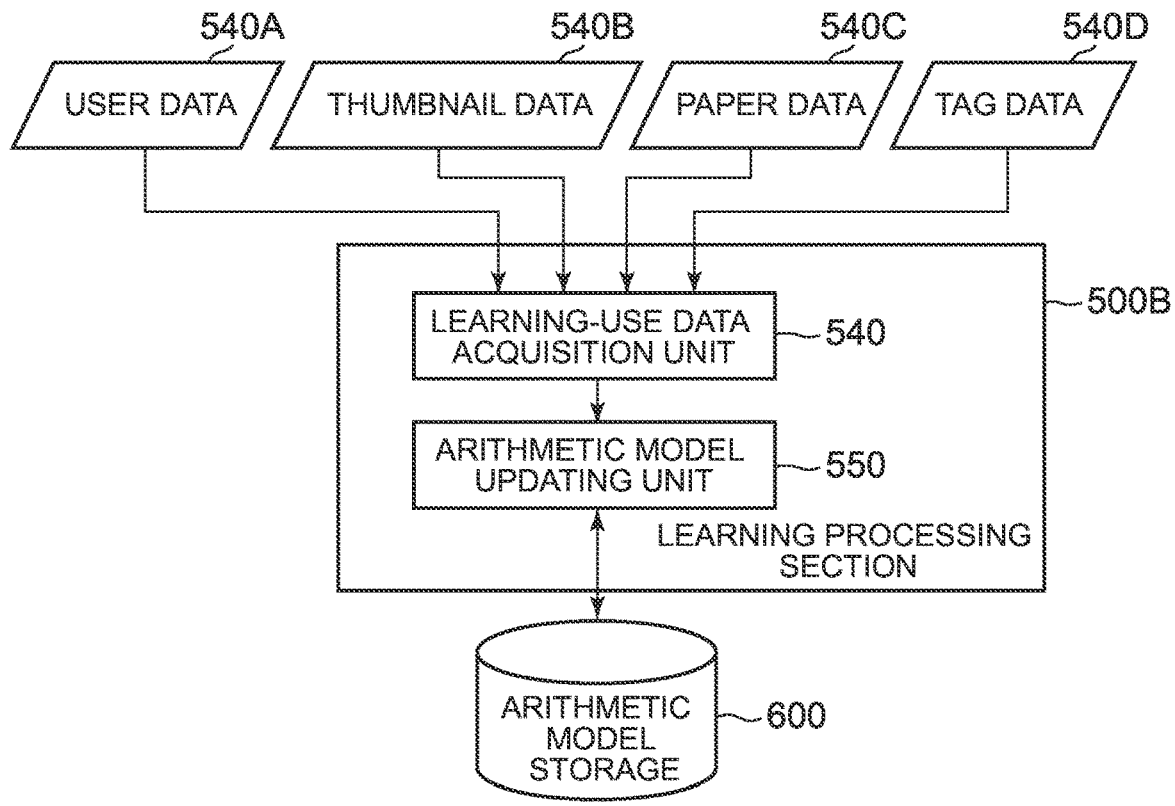
FIG. 8 shows an exemplary configuration of a learning processing section.
FIG. 9 shows an example of target score values.

FIG. 8 shows an exemplary configuration of a learning processing section 500B. The learning processing section 500B may be configured in the server device 10 or in a computer different from the server device 10. For example, in the processing unit 11 of the server device 10, information processing by software may be realized using hardware resources by a processor or the like reading and executing a program stored in advance in a storage of the storage unit 12, and the learning processing section 500B may be configured with a block or process different from the support control section 500A. A processor separate from the processor for configuring the support control section 500A, such as an image processing processor different from the CPU included in the processing unit 11 of the server device 10, may be used. The learning processing section 500B includes a learning-use data acquisition unit 540 and an arithmetic model updating unit 550. In the case where the learning processing section 500B is configured in the processing unit 11 of the server device 10, the processing unit 11 may read and execute a program stored in a storage or the like of the storage unit 12, to implement a third acquisition function by the learning-use data acquisition unit 540 and an update processing function by the arithmetic model updating unit 550. In this case, the storage unit 12 of the server device 10 stores the program for causing the processing unit 11 of the server device 10 as a computer to implement the third acquisition function by the learning-use data acquisition unit 540 and the update processing function by the arithmetic model updating unit 550.

The learning-use data acquisition unit 540 acquires various data used for machine learning of the arithmetic model as the data for learning. The data for learning includes user data 540A, thumbnail data 540B, paper data 540C, and tag data 540D. The user data 540A is data concerning a user who is a first target person, or data concerning both of the user who is the first target person and a user who is a second target person different from the first target person, among a plurality of users who use the information processing services provided by the information processing system 1. The user data 540A may include part or all of the user management data held in the user management table 230 corresponding to the user who is the first or second target person. In the case where the user who is the first target person is a new user, there may be no data concerning that user. In such a case, the user data 540A may be the data concerning the user who is a second target person different from the first target person. For example, for the user data 540A, at least attribute data is used, and characteristic data may be used in addition to the attribute data, as in the case of the user data 510A acquired by the arithmetic-use data acquisition unit 510. The attribute data of the user data 540A indicates a combination of some or all of the gender, age, and location of at least one of the user who is the first target person and the user who is the second target person. The thumbnail data 540B may be contained in the paper management data held in the paper management table 210 as image data indicating the thumbnail image 322. The thumbnail data 540B included in the data for learning may include at least one of the image data of the thumbnail image 322 corresponding to the paper 100 created in the past by the second target person different from the first target person, and the image data of the thumbnail image 322 corresponding to the paper 100 created in the past by the first target person. The thumbnail data 540B corresponds to at least one of second state data, indicating a state in which a functional element such as a tag was used in the past by a second target person different from the first target person, and the first state data saved in the past. The paper data 540C is data concerning the paper 100 that can be displayed and output in the information processing services provided by the information processing system 1. The paper data 540C may include part or all of the paper management data held for each paper 100 in the paper management table 210. For example, the paper data 540C may be data indicating a paper ID assigned to the paper 100 corresponding to the thumbnail image 322 indicated by the image data included in the thumbnail data 540B, as data indicating the paper ID included in the paper management data. The tag data 540D is data concerning various types of tags that can be displayed on the paper 100. The tag data 540D may include part or all of the tag management data held for each object being a tag in the tag management table 220. For example, the tag data 540D may be data indicating a tag ID associated with the paper ID indicated by the paper data 540C, as data indicating the tag ID and the paper ID included in the tag management data. The tag data 540D may also include data indicating the tag type and tag content.

The learning-use data acquisition unit 540 may acquire teacher data, used for generating or updating an arithmetic model by machine learning, on the basis of the paper data 540C and the tag data 540D. For example, with respect to a paper ID included in the paper data 540C, the learning-use data acquisition unit 540 extracts any tag IDs, included in the tag data 540D, associated with the same paper ID. Then, for each of the tag types associated with the extracted tag IDs, the number of tag IDs corresponding to that tag type is divided by the total number of tag IDs associated with the same paper ID. The value obtained by such a process of dividing the number of tags corresponding to a certain tag type by the total number of tags created in the paper 100 becomes the score value as the correct answer for that tag type. The learning-use data acquisition unit 540 acquires the score data indicating the score values obtained for the individual tag types as teacher data which is the correct answer data. As for the first state data indicating the state in which the first target person used a functional element in the past and the second state data indicating the state in which a second target person different from the first target person used a functional element in the past, the learning-use data acquisition unit 540 may acquire the first state data in some cases and acquire both of the first state data and the second state data in other cases. In either case, the learning-use data acquisition unit 540 also acquires the teacher data that is different from the first state data and the second state data. That is, the learning-use data acquisition unit 540 implements the third acquisition function to acquire the first state data or both the first state data and the second state data together with the teacher data that is different from the first state data and the second state data.

The arithmetic model updating unit 550 adjusts the parameters of the arithmetic model used in arithmetic operations by the score arithmetic unit 520 to update the arithmetic model so as to learn the relationship of the user data 540A and the thumbnail data 540B with the score data corresponding to the estimation data. For example, the neural network model shown in FIG. 7 learns the relationship of the user data 540A and the thumbnail data 540B with the score data by so-called supervised learning, on the basis of the teacher data acquired by the learning-use data acquisition unit 540 using the paper data 540C and the tag data 540D among the data for learning. As the method of supervised learning, the error back propagation method (Back Propagation), for example, may be used. The parameters of the arithmetic model, such as weighting coefficients and bias components, may be adjusted so that the score values indicated by the teacher data are obtained when the user data 540A and the thumbnail data 540B are input. The arithmetic model updated by the arithmetic model updating unit 550 may be stored and held in the arithmetic model storage 600 so as to be available for the score arithmetic unit 520. In this manner, the arithmetic model updating unit 550 implements the update processing function to update the arithmetic model by machine learning on the basis of the data acquired by the learning-use data acquisition unit 540 that implements the third acquisition function. The arithmetic model updating unit 550 may also implement a generation processing function to generate an arithmetic model by machine learning based on at least one of the second state data saved in the past and the first state data saved in the past. In accordance with the arithmetic model read from the arithmetic model storage 600, the score arithmetic unit 520 implements the second acquisition function to acquire estimation data, by enabling the output layer in the neutral network model shown in FIG. 7 to output the score data 520A corresponding to the tags created by the user being the first target person in the actual paper 100 in response to the user data 510A and the thumbnail data 510B input to the input layer. Accordingly, the score arithmetic unit 520 implements the second acquisition function (second acquisition means) to acquire estimation data for estimating the information on the functional element matched to the user as the first target person, on the basis of the first state data acquired by the first acquisition function implemented by the arithmetic-use data acquisition unit 510, in accordance with the arithmetic model generated by machine learning based on at least one of the second state data indicating the state in which the second target person different from the first target person used the functional element in the past and the first state data saved in the past. The arithmetic model is generated by machine learning based further on attribute data indicating a combination of some or all of gender, age, and location of at least one of the first target person and the second target person. The second acquisition function of the score arithmetic unit 520 acquires the estimation data, in accordance with the arithmetic model, on the basis of the first state data and the attribute data of the first target person acquired by the first acquisition function implemented by the arithmetic-use data acquisition unit 510.

The arithmetic model updating unit 550 adjusts the parameters of the arithmetic model by machine learning, which is initial learning, using the previously prepared data for learning as training data. Thereafter, the arithmetic model updating unit 550 may adjust the parameters of the arithmetic model by machine learning, which is additional learning, using new data for learning as the training data on the basis of the establishment of an additional learning condition, which is a pre- or post-defined update condition. As an example, on the basis of the number of paper IDs held in the paper management data in the paper management table 210, the additional learning condition may be satisfied every time the number of sheets of paper 100 created increases by a specific number of sheets, such as 100 sheets. As another example, on the basis of the number of user IDs held in the user management data in the user management table 230, the additional learning condition may be satisfied every time the number of registered users increases by a specific number, such as 100. As yet another example, on the basis of the number of tutorial IDs held in the tutorial management data in the tutorial management table 240, the additional learning condition may be satisfied every time the number of stored tutorial items increases by a specific number of items, such as 100 items. Alternatively, the additional learning condition may be satisfied for each tutorial item newly increased. In this case, on the basis of the establishment of the additional learning condition as the update condition, the learning-use data acquisition unit 540 implements the third acquisition function to acquire at least one of the first state data and the second state data included in the thumbnail data 540B together with the teacher data that is different from the first state data and the second state data. The arithmetic model updating unit 550 implements the update processing function to update the arithmetic model by machine learning on the basis of the data acquired by the learning-use data acquisition unit 540.

FIG. 9 shows an example of score values that are the goals of the output from the arithmetic processing according to the arithmetic model in the case where the tags created in the paper 100 include one each of general calculation tag, graph tag, financial calculation tag, and text tag. As described previously, the score value for each tag type calculated using the paper data 540C and the tag data 540D is the value obtained by dividing the number of tags corresponding to the relevant tag type by the total number of tags created in the paper 100. In the present example, since there are four tags in total, the score value corresponding to each tag included in the paper 100 is 0.25. The score value corresponding to each tag that is not included in the paper 100 is 0. Similarly, a tag type with a greater number of tags created in the paper 100 will have a corresponding score value larger than that of a tag type with a smaller number of tags created in the paper 100. The score data taking such score values indicates the probability distribution of the use states according to the tag types when the user uses the tags that are a plurality of types of functional elements according to the tag types. In this case, the score data indicating the probability distribution of the use states can be said to indicate, for the tags created or edited in the past by the user as the first target person or the user as the second target person, the probability of use according to the tag type by the size of the score value. It is then inferred that for the tag type with high probability indicated by the score value, the user has created or used the tag many times and is familiar with and has a high proficiency level with it, while for the tag type with small probability indicated by the score value, the user has created or used the tag few times and is not familiar with and has a low proficiency level with it. The score arithmetic unit 520 may implement the second acquisition function to acquire score data indicating the probability distribution of the use states according to the functional elements corresponding to the tag types, in accordance with the arithmetic model generated by machine learning, on the basis of the first state data acquired by the first acquisition function implemented by the arithmetic-use data acquisition unit 510.

It should be noted that, in the state where the user has used the tags that are a plurality of types of functional elements according to the tag types, the score data may be one that indicates the use ratios or use rates of the respective tags according to the tag types that have been used as the created or edited tags. In this case, the score data indicating the use ratios or use rates can be said to indicate, for the tags created or edited in the past by the user who is the first target person or the user who is the second target person, the tendency of use according to the tag type by the size of the score value. It is inferred that for the tag type with a high score value in such score data, the use has created and used the tag many times and is familiar with and has a high proficiency level with it, while for the tag type with a low score value in the score data, the use has created and used the tag few times and is not familiar with and has a low proficiency level with it. Therefore, the score data indicating the use ratios can also be said to indicate the user's proficiency according to the tag type by the size of the score value, on the basis of the tags created or edited in the past by the user who is the first target person or the user who is the second target person. Furthermore, it is inferred that for the tag type with a high score value in the score data, the tag has been created and used more frequently and the user is more aware of it, while for the tag type with a low score value in the score data, the tag has been created and used less frequently and the user is less aware of it. Therefore, the score data indicating the use ratios can also be said to indicate the evaluation of orientation, which is the degree to which the user has become aware of a tag according to the tag type, by the size of the score value, on the basis of the tags created or edited in the past by the user who is the first target person or the user who is the second target person. The score arithmetic unit 520 may implement the second acquisition function to acquire score data, in accordance with the arithmetic model generated by machine learning, on the basis of the first state data acquired by the first acquisition function implemented by the arithmetic-use data acquisition unit 510, the score data being any of the score data indicating the use ratios or use rates according to the functional elements corresponding to the tag types, the score data indicating the proficiency levels of the first target person according to the functional elements corresponding to the tag types, and the score data indicating the evaluation of the orientation of the first target person according to the functional elements corresponding to the tag types.

As such, the score values which are the goals in the score data to be output as the results of arithmetic operations by the arithmetic model on the basis of the user data 540A and the thumbnail data 540B acquired by the learning-use data acquisition unit 540 can all be calculated by using the paper data 540C and the tag data 540D acquired by the learning-use data acquisition unit 540. The arithmetic model updating unit 550 may adjust the parameters in the arithmetic model so that the relationship with the user data 540A and the thumbnail data 540B is learned using the score data indicating the score values calculated on the basis of the paper data 540C and the tag data 540D as the teacher data. For example, in the neural network model shown in FIG. 7, the arithmetic model can be updated by adjusting the weighting coefficients and bias components using the error back propagation method (Back Propagation).

Accordingly, since the arithmetic model for acquiring the score data 520A has been learned by machine learning, the presentation information determination unit 530 is able to determine, in response to the input of the user data 510A and the thumbnail data 510B, support information such as a tutorial matched to the user who is the first target person as the information on the tag which is the functional element, on the basis of the score data 520A acquired by the score arithmetic unit 520. For example, the score data 520A to be acquired by the score arithmetic unit 520 when the user data 510A and thumbnail data 510B corresponding to the user who is the first target person are acquired by the arithmetic-use data acquisition unit 510 as the data for arithmetic operations can be made to indicate a common score value with that of a user, among the users as the second target persons, who has user data or the like that matches the user as the first target person. The user data and thumbnail data corresponding to the user who is the second target person are included in the user data 540A and the thumbnail data 540B acquired by the learning-use data acquisition unit 540, and the parameters of the arithmetic model have been adjusted by the arithmetic model updating unit 550, on the basis of the teacher data obtained from the paper data 540C and the tag data 540D, so as to be able to obtain score data that matches the correct answer data. In this case, the score data obtained corresponding to the user who is the second target person can be applied to the user who is the first target person. Accordingly, the arithmetic model generated by machine learning based on the data for learning acquired by the learning-use data acquisition unit 540 has its parameters adjusted so as to be able to obtain the score data 520A that indicates the score values adapted to the data for arithmetic operations acquired by the arithmetic-use data acquisition unit 510.

The tutorials with their data contents held in the tutorial data table 250 can be divided into a plurality of degrees of detail of information according to the levels of detail held in the tutorial management table 240. For example, seven levels of detail may be provided, from the first level to the seventh level, with the first level being the simplest and the seventh level being the most detailed. More specifically, a tutorial at the first level may show only a tag item, a tutorial at the second level may show a simplified functional explanation, a tutorial at the third level may show a simplified example, a tutorial at the fourth level may show a detailed functional explanation, a tutorial at the fifth level may show a first detailed example, a tutorial at the sixth level may show a second detailed example, and a tutorial at the seventh level may show an overall detailed explanation.

FIG. 10 shows a specific example in which the tutorial to be presented is determined by executing arithmetic processing according to an arithmetic model using data for arithmetic operations. In this specific example, with the score arithmetic unit 520 performing arithmetic processing according to the arithmetic model, score data 520A is obtained which has: a score value of 0.25 for a general calculation tag, a score value of 0.4 for a graph tag, a score value of 0.15 for a geometry tag, a score value of 0.03 for a statistics-use mathematical table tag, a score value of 0.05 for a numerical sequence calculation tag, a score value of 0.1 for a financial calculation tag, and a score value of 0.02 for a text tag.

When the score data 520A indicating such score values is acquired, the presentation information determination unit 530 assigns ranks to the tags in descending order of the score value. In the specific example in FIG. 10, the graph tag is ranked first, the general calculation tag is ranked second, the geometry tag is ranked third, the financial calculation tag is ranked fourth, the numerical sequence calculation tag is ranked fifth, the statistics-use mathematical table tag is ranked sixth, and the text tag is ranked seventh. Next, the presentation information determination unit 530 determines the stages and combinations for presented tutorials, which are the tutorials to be presented by the terminal device 20, according to the ranks of the tags. In the specific example in FIG. 10, an item of the first level alone is determined for the graph tag ranked first, a simplified functional explanation of the second level for the general calculation tag ranked second, a simplified functional explanation of the second level and a simplified example of the third level for the geometry tag ranked third, a detailed functional explanation of the fourth level and a simplified example of the third level for the financial calculation tag ranked fourth, a detailed functional explanation of the fourth level and a first detailed example of the fifth level for the numerical sequence calculation tag ranked fifth, a detailed functional explanation of the fourth level, a first detailed example of the fifth level, and a second detailed example of the sixth level for the statistics-use mathematical table tag ranked sixth, and a detailed functional explanation of the fourth level, a first detailed example of the fifth level, a second detailed example of the sixth level, and an overall detailed explanation of the seventh level for the text tag ranked seventh. The tutorials determined by the presentation information determination unit 530 may be presented, when a new tag is created in the paper 100, by the display output corresponding to its tag type. In the case where a combination of a plurality of tutorials has been determined for a tag type, the tutorials may be presented by displaying and outputting them side by side, or on top of each other.

As such, the presentation information determination unit 530 may differentiate the degree of detail of the information to be presented to the user by means of display output in the output unit 24 of the terminal device 20, according to the plurality of types of functional elements corresponding to the tag types, on the basis of the score data 520A acquired as the results of the arithmetic operations according to the arithmetic model by the score arithmetic unit 520. Further, the presentation information determination unit 530 may present support information consisting of a single tutorial in some cases and present support information consisting of a plurality of tutorials in other cases, as the information to be presented to the user by means of display output in the output unit 24 of the terminal device 20, according to the plurality of types of functional elements corresponding to the tag types, on the basis of the score data 520A acquired as the results of the arithmetic operations according to the arithmetic model by the score arithmetic unit 520. That is, the presentation information determination unit 530 may differentiate the quantity of the information to be presented to the user who is the first target person, according to the plurality of types of functional elements corresponding to the tag types, on the basis of the score data 520A acquired as the results of the arithmetic operations according to the arithmetic model by the score arithmetic unit 520.

Figure 11:
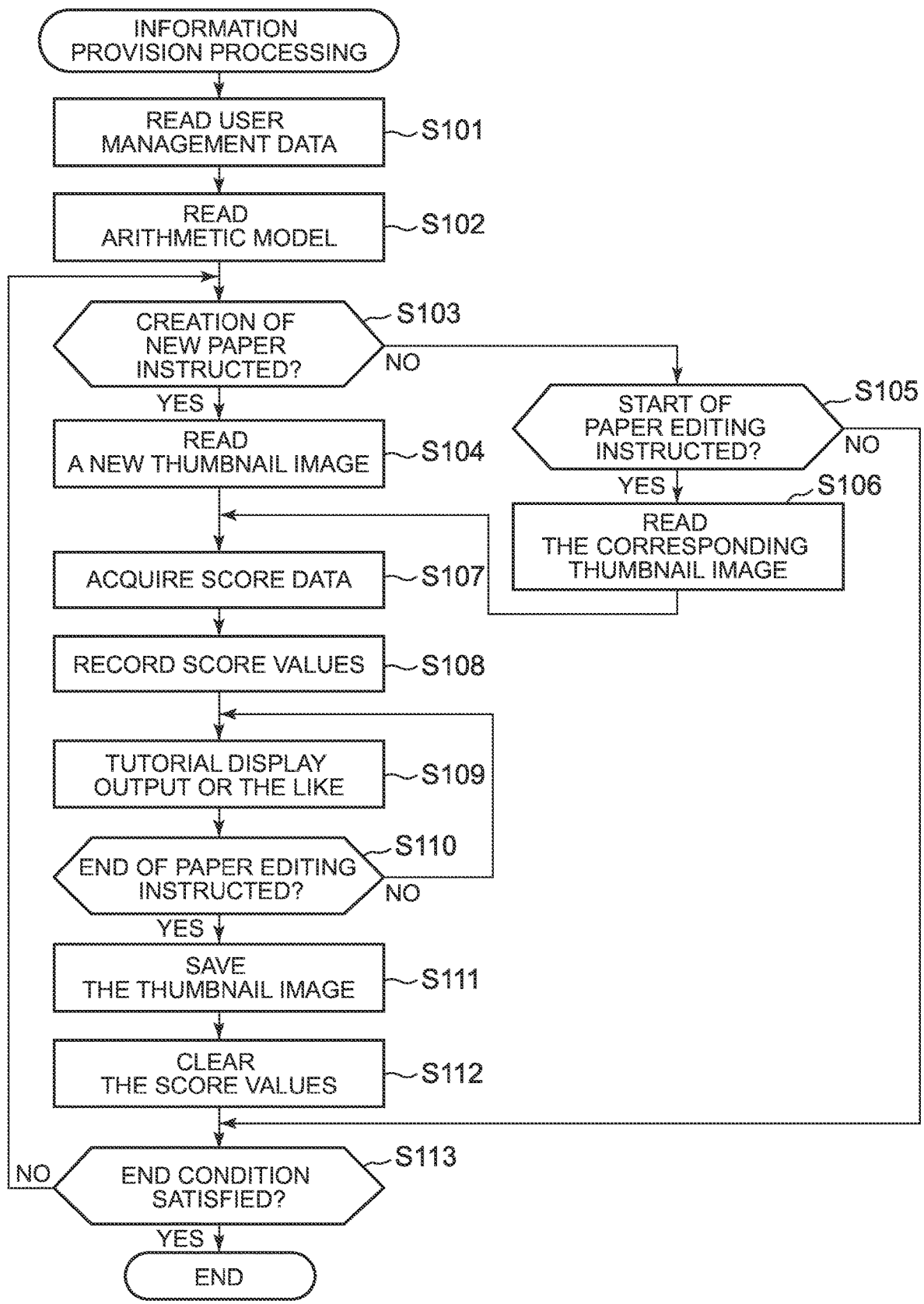
FIG. 11 is a flowchart illustrating an example of information provision processing.

FIG. 11 is a flowchart showing an example of information provision processing executed in the information processing system 1 when a user as a first target person is to use the information processing services. Such information provision processing may be one in which information processing by software is realized using hardware resources, by a processor or the like of the processing unit 11 in the server device 10 reading and executing a program stored in advance in a storage of the storage unit 12. The information provision processing starts to be executed when the processing unit 11 of the server device 10 permits login in response to an access from the terminal device 20, for example.

When permitting login of a user, the processing unit 11 of the server device 10 reads the user management data held in the user management table 230 of the database 200 (step S101). At this time, the processing unit 11 identifies the user ID assigned to the user who has been allowed to log in and is to be the first target person. The user management data corresponding to the identified user ID is then read from the storage unit 12. For example, the processing unit 11 of the server device 10 reads the user management data by the arithmetic-use data acquisition unit 510 in the support control section 500A. The arithmetic-use data acquisition unit 510 reads the user management data corresponding to the identified user ID from the user management table 230 in the database 200 provided in the storage unit 12, to obtain the user data 510A. When the user is allowed to log in, the My Page screen 320 prepared for each user is provided by display output on the display output device included in the output unit 24 of the terminal device 20.

Subsequently, the processing unit 11 of the server device 10 reads the arithmetic model prepared for the user (step S102). For example, the processing unit 11 of the server device 10 may select an arithmetic model corresponding to the user ID from among the arithmetic models stored and prepared in the arithmetic model storage 600 provided in a storage of the storage unit 12 or the like, and read it into a work area such as a RAM so that it can be used in the arithmetic processing by the score arithmetic unit 520.

Thereafter, it is judged whether the creation of a new paper has been instructed (step S103). For example, the input manipulation of selecting the create icon 327 in the My Page screen 320 is detected by the touch panel or mouse included in the input unit 23 of the terminal device 20, and notified to the processing unit 21 of the terminal device 20. The processing unit 21 of the terminal device 20 transmits a request according to this notification from the communication unit 25 to the server device 10 via the network 30. The request transmitted at this time is also referred to as a new creation request. On receipt of the new creation request from the terminal device 20, the processing unit 11 of the server device 10 can recognize that the creation of a new paper 100 has been instructed.

When the creation of a new paper is instructed (step S103; Yes), image data indicating a new thumbnail image 322 is read (step S104). For example, the processing unit 11 of the server device 10 reads the image data indicating the new thumbnail image 322 by the arithmetic-use data acquisition unit 510 in the support control section 500A, to acquire thumbnail data 510B. The thumbnail data 510B acquired at this time is supplied to the score arithmetic unit 520 together with the user data 510A.

When the creation of a new paper is not instructed (step S103; No), it is judged whether the start of editing of the paper 100 with the thumbnail image 322 displayed on the My Page screen 320 has been instructed (step S105). For example, the input manipulation of selecting the thumbnail image 322 in the My Page screen 320 is detected by the touch panel or mouse included in the input unit 23 of the terminal device 20, and is notified to the processing unit 21 of the terminal device 20. The processing unit 21 of the terminal device 20 transmits a request according to this notification from the communication unit 25 to the server device 10 via the network 30. The request transmitted at this time is also referred to as an editing start request. On receipt of the editing start request from the terminal device 20, the processing unit 11 of the server device 10 can recognize that an instruction to start editing the paper 100 corresponding to the thumbnail image 322 has been given.

When the start of editing of the paper 100 is instructed (step S105; Yes), the image data indicating the thumbnail image 322 corresponding to the paper 100 for which the start of editing has been instructed is read (step S106). For example, the processing unit 11 of the server device 10 reads the image data indicating the thumbnail image 322 corresponding to the paper 100 by the arithmetic-use data acquisition unit 510 in the support control section 500A to acquire the thumbnail data 510B. The thumbnail data 510B acquired at this time is supplied to the score arithmetic unit 520 together with the user data 510A. With the image data indicating the thumbnail image 322 being read in step S104 or step S106, a first step of acquiring the first state data, indicating the state in which the first target person has used the functional element realized by the execution of a target program is executed in the processing unit 11 of the server device 10 or the like.

Following the reading of the image data indicating the thumbnail image 322 in step S104 or step S106, the score arithmetic unit 520 performs arithmetic operations based on the user data 510A and the thumbnail data 510B in accordance with the arithmetic model generated by machine learning, to acquire score data 520A for estimating the information on the functional element matched to the user (step S107). The score data 520A acquired at this time is temporarily stored in a RAM, for example, in the storage unit 12 of the server device 10, and the score values indicated in the score data 520A are recorded (step S108). The score data 520A acquired through the arithmetic operations by the score arithmetic unit 520 is supplied to the presentation information determination unit 530. With the score data 520A being acquired in step S107, a second step of acquiring estimation data for estimating the information on the functional element matched to the user as the first target person, on the basis of the first state data acquired in the first step, in accordance with the arithmetic model generated by machine learning based on at least one of the second state data indicating the state in which a second target person different from the first target person has used the functional element in the past and the first state data saved in the past is executed.

After determining the information to be presented to the user on the basis of the score data 520A from the score arithmetic unit 520, the presentation information determination unit 530 causes the presentation of the tutorial in the terminal device 20 by means of display output or the like (step S109). For example, after a new paper 100 is created, when the creation of a new tag is instructed in response to the selection of an icon in the menu icon bar 50 or the like, the display content of the tutorial corresponding to the tag type is determined in accordance with the score value indicated in the score data 520A. Further, at the initiation of the editing of the paper 100, when tags are displayed on the screen display 26 of the paper 100, the display contents of the tutorials corresponding to the tag types of the displayed tags are determined in accordance with the score values indicated in the score data 520A. The presentation information determination unit 530 generates presentation control data 530A that controls the presentation of the determined tutorials. The processing unit 11 of the server device 10 causes the presentation control data 530A to be transmitted from the communication unit 13 to the terminal device 20 via the network 30. The processing unit 21 of the terminal device 20, in receipt of the presentation control data 530A from the server device 10, presents the tutorials by the display output in the output unit 24. With the presentation of a tutorial being performed in step S109, a third step of causing the presentation unit to present the information on the functional element matched to the user who is the first target person on the basis of the estimation data acquired in the second step is executed.

After a new paper 100 is created or after the editing of the paper 100 corresponding to the thumbnail image 322 is started, a plurality of types of functional elements according to the individual tags are provided in response to the manipulation inputs detected by the input unit 23 of the terminal device 20. The input data and input instructions in the terminal device 20 while the screen display 26 of the paper 100 is being displayed and output are sent to the server device 10 via the network 30. The processing unit 11 of the server device 10, on the basis of the input data and input instructions received from the terminal device 20, performs processing of providing a plurality of types of functional elements, such as outputting calculation results, drawing graphs or figures, creating mathematical tables, and so on. The output data indicating the results of the processing are sent from the server device 10 to the terminal device 20 via the network 30. The processing unit 21 of the terminal device 20 updates the display output in the display output device of the output unit 24 on the basis of the output data received from the server device 10.

While the screen display 26 of the paper 100 is being displayed and output in this manner, it is judged whether the end of editing by paper close of that paper 100 has been instructed (step S110). For example, the input manipulation on the screen display 26 of the paper 100 of selecting the menu item to return to the My Page screen 320 is detected by the touch panel, mouse, or the like included in the input unit 23 of the terminal device 20, and is notified to the processing unit 21 of the terminal device 20. The processing unit 21 of the terminal device 20 transmits a request according to this notification from the communication unit 25 to the server device 10 via the network 30. The request transmitted at this time is also referred to as an editing end request. On receipt of the editing end request from the terminal device 20, the processing unit 11 of the server device 10 can recognize that the end of editing of the paper 100 has been instructed.

If the end of editing of the paper 100 is not instructed (step S110; No), the process returns to step S109, and the control of presentation by display output of the tutorial or the like is performed. On the other hand, when the end of editing of the paper 100 is instructed (step S110; Yes), the processing unit 11 of the server device 10 creates image data indicating the thumbnail image 322 corresponding to the paper 100 that has been edited, and saves the image data by storing it in the storage unit 12 (step S111). For example, the processing unit 11 of the server device 10 updates the paper management data of the paper management table 210 in the database 200, whereby the image data indicating the new thumbnail image 322 is saved.

When the editing of the paper 100 is thus completed, the display output on the display output device included in the output unit 24 of the terminal device 20 returns to the display of the My Page screen 320. In response to the paper 100 being closed, the processing unit 11 of the server device 10 clears the recording of the score values by erasing the score data 520A (step S112). Thereafter, when accepting instructions in the My Page screen 320, it is judged whether the end condition has been satisfied (step S113). Even if the start of editing the paper 100 is not instructed in the My Page screen 320 (step S105; No), the process may proceed to step S113 to judge whether the end condition has been satisfied. In step S113, it may be judged that the end condition has been satisfied when a specific input manipulation is detected or when the end judgment time has elapsed without an input manipulation being detected, such as when an input manipulation of logout or an input manipulation to shift to another page is detected in the My Page screen 320 or when a preset timeout period has elapsed without an input manipulation being detected. If the end condition is not satisfied (step S113; No), the process returns to step S103 and waits for an instruction to create a new paper or the like. On the other hand, when the end condition is satisfied (step S113; Yes), the processing unit 11 of the server device 10 terminates the information provision processing.

When the creation of a new paper is instructed, a tour function explaining how to use the information processing services in a step-by-step manner may be implemented using presentation control data 530A that causes support information as a plurality of tutorials to be combined and displayed and output sequentially. For example, tutorials prepared in a plurality of degrees of detail of information corresponding to tag types are configured such that a combination of a plurality of tutorials is determined according to the tag type, regardless of the ranks assigned to the tags by the score values indicated by the score data 520A. When the score data 520A indicating the score values is acquired, the presentation information determination unit 530 determines the tour function to be performed upon creation of a new paper, on the basis of the ranks assigned to the tags. For example, at the first-time creation, i.e. when the creation of a new paper is instructed for the first time, the tour function corresponding to the tag type with the highest score value is determined, and presentation control data 530A for presenting a plurality of tutorials by sequentially displaying and outputting them is generated. At the multiple-time creation, i.e. when the creation of a new paper is instructed for the second or later time, the tour function corresponding to the tag type with the smallest score value is determined, and presentation control data 530A for presenting a plurality of tutorials by sequentially displaying and outputting them is generated. Alternatively, at the multiple-time creation when the creation of a new paper is instructed for the second or later time, the tour function to be performed may be determined from among the tour functions corresponding to the plurality of tag types according to the number of times a new paper has been created, so as to be changed from the one corresponding to the tag type with a higher score value to the one corresponding to the tag type with a lower score value as the number of times of creation of the new paper increases, and the presentation control data 530A may be generated accordingly. The presentation control data 530A may be control data that automatically starts the tour function, or may be control data that prompts the user to start the tour function.

The presentation information determination unit 530 may be one that can determine the provision of various information on the basis of the score values indicated by the score data 520A acquired by the score arithmetic unit 520. For example, the icons corresponding to the individual tags provided in the menu icon bar 50 may be set to different display color according to the score values indicated by the score data 520A. When the presentation information determination unit 530 has assigned ranks to the tag types using the score values indicated by the score data 520A, the unit determines the display color of the icons corresponding to those tag types. As an example of determining the display color of icons, the display color of icons may be determined as follows: red for the first-ranked tag type, orange for the second-ranked tag type, yellow for the third-ranked tag type, green for the fourth-ranked tag type, blue for the fifth-ranked tag type, indigo for the sixth-ranked tag type, and purple for the seventh-ranked tag type. The display color of the icons can be changed in the process of estimating the information on the functional elements matched to the user. For example, the display color of the icon that is frequently clicked or tapped by the user may be changed so as to be associated with the rank with the higher score value. Not limited to the display color of icons, the manner of presentation of information may be differentiated by varying the display manner of any of, for example, the display size or display position of the icons, the shape, pattern, gloss, or brightness of the icons, or a combination of some or all of them. In this manner, the presentation information determination unit 530 may differentiate the presentation manner of icons that instruct the start of the functional elements by creation of the tags, according to the plurality of types of functional elements corresponding to the tag types, on the basis of the score data 520A acquired by the score arithmetic unit 520. The icon as information to instruct the start of a functional element is included in the information on the functional element.

Figures 12, 13:
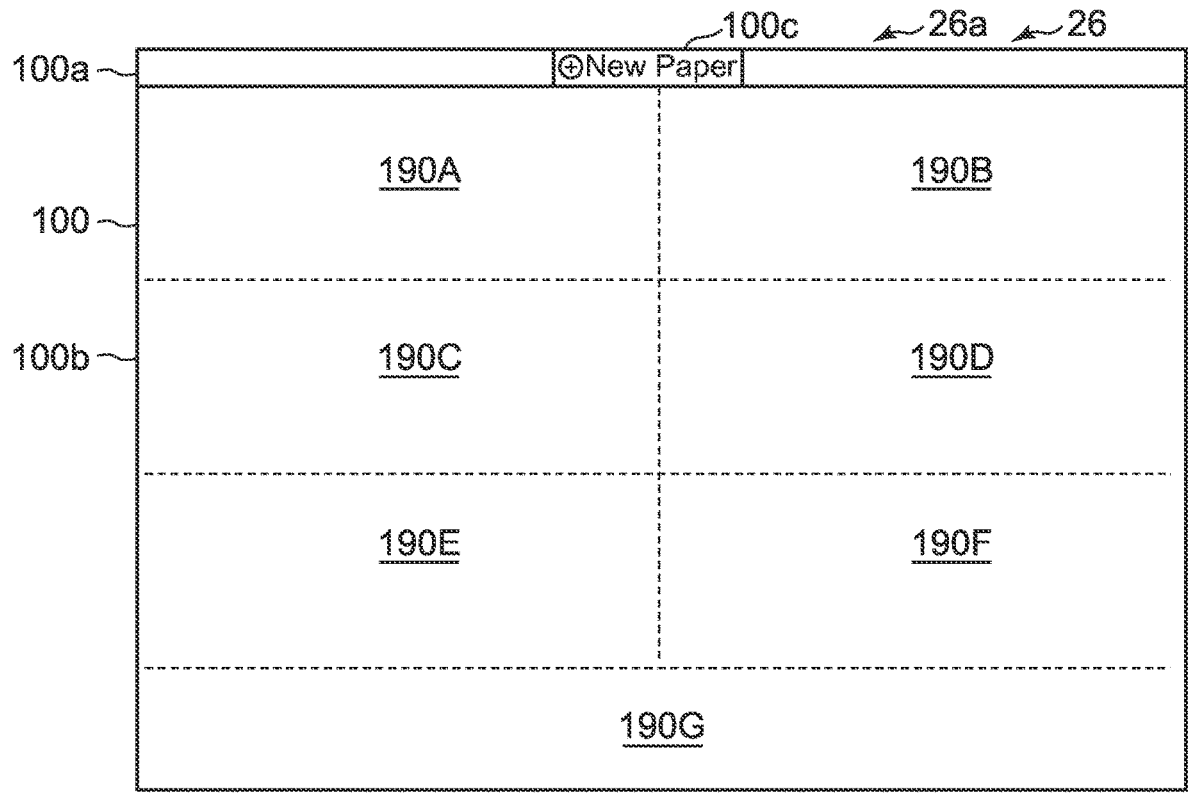
FIG. 12 shows a case of setting a plurality of display areas.
FIG. 13 shows an example of how coordinate values of tags are determined.

As another example, in the screen display 26 of the paper 100 presented by display output by the output unit 24 of the terminal device 20, the presentation position for display output of a tutorial may be set to a different position according to the score value indicated by the score data 520A. In this case, the screen display 26 of the paper 100 is set to be divided into seven display areas 190A to 190G as shown in FIG. 12 as a plurality of display areas. In practice, however, the boundaries of the display areas 190A to 190G are not displayed; the setting may be made just in connection with presentation of the tutorials. When the presentation information determination unit 530 has assigned ranks to the tag types using the score values indicated by the score data 520A, the unit determines the display areas corresponding to those tag types. As an example of determining the display areas, the presentation positions of the tutorials may be determined as follows: the display area 190A is for the first-ranked tag type, the display area 190B for the second-ranked tag type, the display area 190C for the third-ranked tag type, the display area 190D for the fourth-ranked tag type, the display area 190E for the fifth-ranked tag type, the display area 190F for the sixth-ranked tag type, and the display area 190G for the seventh-ranked tag type. The presentation positions of the tutorials may be changed in the process of estimating the information on the functional elements matched to the user. For example, the display area in which the user has created tags a large number of times can be changed so as to be associated with the rank with a higher score value. In this manner, the presentation processing function of the presentation information determination unit 530 may determine different positions in the screen display 26 to be the positions where the information on the functional elements such as the tutorials are to be presented, according to the plurality of types of functional elements corresponding to the tag types, on the basis of the score data 520A that corresponds to the estimation data acquired by the second acquisition function of the score arithmetic unit 520.

As described above, in the information processing system 1 according to the present embodiment, the components of the support control section 500A shown in FIG. 6 are implemented by the information processing using the processing unit 11 of the server device 10. In the support control section 500A, the first acquisition function implemented by the arithmetic-use data acquisition unit 510 acquires first state data, such as thumbnail data 510B, indicating the state in which a user, who is a first target person, has used a functional element realized by execution of a target program, corresponding to an object that serves as a tag or the like. The second acquisition function implemented by the score arithmetic unit 520 acquires score data 520A, which is estimation data for estimating information on a functional element matched to the user who is the first target person, in accordance with an arithmetic model, on the basis of the first state data acquired by the first acquisition function of the arithmetic-use data acquisition unit 510, the arithmetic model being generated by machine learning based on at least one of second state data, such as thumbnail data 540B, indicating the state in which a user as a second target person different from the user as the first target person has used a functional element in the past, and the first state data in the past, such as thumbnail data 540B, indicating the state in which the user as the first target person has used the functional element in the past. The presentation processing function implemented by the presentation information determination unit 530 generates presentation control data 530A on the basis of the score data 520A corresponding to the estimation data acquired by the second acquisition function of the score arithmetic unit 520, and causes the information on the functional elements to be presented by display output in the output unit 24 of the terminal device 20. It is therefore possible to improve the user convenience by appropriately presenting the information on the functional elements matched to the user who is the first target person, in accordance with the arithmetic model generated by machine learning, on the basis of the acquired estimation data.

The arithmetic model is generated by machine learning based further on the user data 540A that is attribute data indicating a combination of some or all of gender, age, and location of at least one of the user who is the first target person and the user who is the second target person. The first acquisition function implemented by the arithmetic-use data acquisition unit 510 further acquires the user data 510A that is the attribute data of the user who is the first target person. The second acquisition function implemented by the score arithmetic unit 520 acquires the score data 520A corresponding to the estimation data, in accordance with the arithmetic model, on the basis of the first state data and the user data 510A that is the attribute data of the user who is the first target person acquired by the first acquisition function of the arithmetic-use data acquisition unit 510. In this manner, the estimation data is acquired, in accordance with the arithmetic model generated by machine learning based further on the attribute data of the user who is the first target person and so on, on the basis of the first state data as well as the attribute data of the user who is the first target person. It is thus possible to improve the user convenience by more appropriately presenting the information on the functional elements matched to the user being the first target person.

The presentation processing function implemented by the presentation information determination unit 530 causes information varying in degree of detail according to a plurality of types of functional elements corresponding to the tag types to be presented by display output in the output unit 24 of the terminal device 20 that serves as the presentation unit, on the basis of the score data 520A corresponding to the estimation data. In this manner, the presentation unit is made to present the information with different degrees of detail according to the plurality of types of functional elements. It is thus possible to improve the user convenience by further more appropriately presenting the information on the functional elements varied in degree of detail to be matched to the user being the first target person.

The presentation processing function implemented by the presentation information determination unit 530 causes information varying in quantity according to the plurality of types of functional elements corresponding to the tag types to be presented by display output in the output unit 24 of the terminal device 20 that serves as the presentation unit, on the basis of the score data 520A corresponding to the estimation data. In this manner, the presentation unit is made to present the information with different quantities according to the plurality of types of functional elements. It is thus possible to improve the user convenience by further appropriately presenting the information on the functional elements varied in quantity to be matched to the user being the first target person.

The information on the functional elements is support information that shows the way of use corresponding to the plurality of types of functional elements, such as tutorials according to the tag types. Such support information is presented as the information on the functional elements by the presentation unit. It is thus possible to improve the user convenience by appropriately presenting the support information that is matched to the user being the first target person.

The thumbnail data 510B and the thumbnail data 540B, constituting the first state data and the second state data, are image data showing thumbnail images 322 corresponding to the screen display 26 of the paper 100 in which the functional elements such as tags are used. In accordance with the arithmetic model generated by machine learning based on the first state data and the second state data being such image data, the presentation unit is made to present the information on the functional elements matched to the first target person, on the basis of the first state data. It is thus possible to improve the user convenience by appropriately presenting the information on the functional elements matched to the user being the first target person.

The presentation processing function implemented by the presentation information determination unit 530 causes the information on the functional elements, such as the information instructing a start for the functional elements, like the icons in the menu icon bar 50, to be presented in different presentation manners according to the plurality of types of functional elements, like the display color of the icons, by display output in the output unit 24 of the terminal device 20 serving as the presentation unit, on the basis of the score data 520A corresponding to the estimation data. In this manner, the presentation unit is made to provide the presentation in different presentation manners according to the plurality of types of functional elements. It is thus possible to improve the user convenience by appropriately presenting the information matched to the user who is the first target person to allow the user to readily recognize the information on the functional elements.

The presentation processing function implemented by the presentation information determination unit 530 determines different positions in the presentation unit according to the plurality of types of functional elements to be the positions where the information on the functional elements is to be presented, such as the presentation positions at which the tutorials are to be displayed and output in the output unit 24 of the terminal device 20, on the basis of the score data 520A corresponding to the estimation data. In this manner, the information on the functional elements is made to be presented in different positions in the presentation unit according to the plurality of types of functional elements. It is thus possible to improve the user convenience by appropriately presenting the information matched to the user being the first target person to allow the user to readily recognize the information on the functional elements.

The third acquisition function implemented by the learning-use data acquisition unit 540 acquires the thumbnail data 540B corresponding to at least one of the first state data and the second state data, together with the paper data 540C and the tag data 540D corresponding to the teacher data that is different from the first state data and the second state data. The update processing function implemented by the arithmetic model updating unit 550 updates the arithmetic model by machine learning on the basis of the data acquired by the third acquisition function of the learning-use data acquisition unit 540. In this manner, the presentation unit is made to present the information on the functional elements, in accordance with the arithmetic model updated by machine learning, on the basis of the acquired estimation data. It is thus possible to improve the user convenience by appropriately presenting the information that is matched to the user being the first target person.

The present invention is not limited to the above embodiment, and various modifications are possible. For example, the server device 10 does not have to include all the technical features shown in the above embodiment; it may include part of the configuration described in the above embodiment so as to be able to solve at least one of the problems in the conventional technology. When a matter of a subordinate concept has been described in the above embodiment, an invention of a superordinate concept using a homologous or similar matter, or an invention of a superordinate concept using a common property, is encompassed in the invention of the present application, and it may have some of the structures and properties described in the above embodiment so as to be able to solve at least one of the problems in the conventional technology.

The tutorial 107 shown in FIG. 3 presents support information to the user by displaying and outputting descriptive information using letters, numbers, symbols, and the like. Instead of or in addition to such descriptive information, any output, such as the display output of video information using still images or moving images, the output of audio information, or a combination thereof may be controlled to present the support information to the user.

In the information provision processing shown in FIG. 11, the image data showing the thumbnail image 322 may be created and stored and saved in the storage unit 12 at any timing besides step S111. For example, the image data showing the thumbnail image 322 may be created at the timing when a new tag is created or when an existing tag is edited in the screen display 26 of the paper 100. Further, the image data showing the thumbnail image 322 may be stocked in the paper management table 210, at the timing when the image data showing the thumbnail image 322 is created, in association with the date and time information indicating the creation date and time or the like. In this manner, the paper management table 210 may save the image data showing the thumbnail image 322 together with the date and time information as the history information showing the history of creation and editing of the tags for each paper 100. When the image data showing the thumbnail image 322 is saved in the paper management table 210, the tag management data held in the tag management table 220 may also be updated. The learning-use data acquisition unit 540 may acquire, as the thumbnail data 540B included in the data for learning, the image data showing the thumbnail image 322 and the date and time information that serves as the history information corresponding to one paper 100. Further, the learning-use data acquisition unit 540 may acquire, as the tag data 540D included in the data for learning, part or all of the tag management data that is the history information corresponding to one paper 100. The arithmetic model updating unit 550 may update the arithmetic model such that score data that indicates the probability distribution for use in predicting the possibilities of the functional elements corresponding to the tag types being selected, such as a tag to be created or edited next time when the user uses tags which are the plurality of types of functional elements according to the tag types, can be obtained by machine learning based on the thumbnail data 540B and the tag data 540D, which are the history information acquired by the learning-use data acquisition unit 540. In this case, the score data indicating the probability distribution can be said to indicate, by means of a large or small score value, a predicted likelihood of next use of a functional element according to the tag type, on the basis of the history of creation or editing of tags in the past by the user who is the first target person or the user who is the second target person. The score arithmetic unit 520 may implement the second acquisition function to acquire the score data indicating the predicted likelihood of use according to the functional elements, in accordance with the arithmetic model generated by machine learning, on the basis of the first state data acquired by the first acquisition function implemented by the arithmetic-use data acquisition unit 510.

Instead of or together with the score arithmetic unit 520, a coordinate arithmetic unit may be provided. The coordinate arithmetic unit uses the data for arithmetic operations acquired by the arithmetic-use data acquisition unit 510 to perform arithmetic processing according to an arithmetic model as a learned model generated by machine learning. The coordinate arithmetic unit may acquire an arithmetic model from the arithmetic model storage 600 included in the storage unit 12 or the like of the server device 10, for example, and perform arithmetic processing according to the arithmetic model. The arithmetic model used by the coordinate arithmetic unit may be a learned model, with the user data 510A and thumbnail data 510B included in the data for arithmetic operations being input, generated by machine learning so as to output coordinate data indicating coordinate values, which are the display coordinates of tags corresponding to the respective tag types, and it may be, for example, a neural network model similar to the configuration example shown in FIG. 7. In the neural network model used by the coordinate arithmetic unit, a plurality of neurons included in the output layer output the coordinate data indicating the coordinate values that are the display coordinates of the tutorials corresponding to the respective tag types. The coordinate data may indicate coordinate values that can designate the display position of a tag on the screen display 26 of the paper 100. The coordinate data may correspond to coordinate values on a one-to-one basis, or a pair of coordinate values may be designated for each range of coordinate data.

FIG. 13 shows an example in which coordinate values of tags are determined by the coordinate arithmetic unit executing arithmetic processing using an arithmetic model. The presentation information determination unit 530 determines coordinate values of the tags placed on the paper 100, on the basis of the coordinate data as the results of arithmetic operations by the coordinate arithmetic unit, as information to be presented by the terminal device 20 to the user in the information processing services, by display output in the output unit 24. It should be noted that the coordinate values of a tag not placed on the paper 100 may be determined at the origin. As such, the coordinate data acquired by the coordinate arithmetic unit indicates the coordinates where the plurality of types of functional elements according to the tag types are to be provided, by display output in the output unit 24 of the terminal device 20, to the user being the first target person who uses the tags as the functional elements in the information processing services provided by the information processing system 1.

The presentation information determination unit 530 generates presentation control data 530A so as to perform control of changing the display position of each tag to the coordinates indicated by the coordinate data. The presentation control data 530A may include, for example, display position information for updating the information such as tag contents held in the tag management table 220 and for changing the display positions of the tags on the screen display 26 of the paper 100. As in the above embodiment, the presentation control data 530A generated by the presentation information determination unit 530 is transmitted to the terminal device 20, and the processing unit 21 of the terminal device 20 updates the display output on the display output device of the output unit 24. With this, with respect to the plurality of types of functional elements such as tags to be provided in the information processing services, the tags that realize the functional elements may be presented as functional information at positions matched to the user. In this case as well, it is possible to present the information on the functional elements matched to the user in the information processing services, by supplying the presentation control data 530A generated by the presentation information determination unit 530 to the terminal device 20.

As such, the information to be presented using the presentation control data 530A generated by the presentation information determination unit 530 is not limited to the tutorials explaining the way of use, but may also be information to realize the plurality of types of functional elements provided in the information processing services themselves, such as the display positions of the tags. That is, the tags, which are information on the functional elements used or information presented as the functional elements, are included in the information on the functional elements. The second acquisition function implemented by the coordinate arithmetic unit acquires coordinate data indicating the coordinates of the information on the functional elements such as tags corresponding to the plurality of types of functional elements, in accordance with the arithmetic model, on the basis of the thumbnail data 510B corresponding to the first state data acquired by the first acquisition function of the arithmetic-use data acquisition unit 510. The presentation processing function implemented by the presentation information determination unit 530 changes the position at which the information on the functional element such as a tag is to be presented by display output in the output unit 24 of the terminal device 20, on the basis of the coordinate data acquired by the second acquisition function of the coordinate arithmetic unit. Thus, the position at which the functional information is to be presented is changed in accordance with the arithmetic model, on the basis of the acquired coordinate data. It is thus possible to improve the user convenience by presenting the functional information at an appropriate position matched to the user who is the first target person.

Besides the above, the information determined by the components of the support control section 500A may be presented in the case of presenting various information on the functional elements, such as a question to be answered using each functional element, a problem to be solved using each functional element, or a mission to be accomplished using each functional element by a user who can use the plurality of types of functional elements provided in the information processing services.

The data for arithmetic operations acquired by the arithmetic-use data acquisition unit 510 may be, instead of the thumbnail data 510B, detailed image data acquired by capturing the screen display 26 of the paper 100, for example. The data for arithmetic operations may also include data indicating the information on the paper 100 or on the individual tags, such as part or all of the information included in the paper management data held in the paper management table 210, or part or all of the information included in the tag management data held in the tag management table 220. For example, the arithmetic-use data acquisition unit 510 extracts tag IDs from the tag management data held in the tag management table 220. It then counts the number of times of use for each tag type associated with the extracted tag IDs. The number of times of use for each tag type may be counted for each user, or for a plurality of users who are judged to have commonality in part or all of the attribute data or characteristic data. The number of times of use for each tag type thus counted may be input by the score arithmetic unit 520 to the input layer of the neural network model shown in FIG. 7, together with the user data 510A and thumbnail data 510B, or in place of part of the user data 510A and thumbnail data 510B. In this case, the input layer of the neural network model for the score arithmetic unit 520 to perform the arithmetic processing includes neurons to which data indicating the number of times of use according to the functional elements corresponding to the tag types is input. Therefore, the second acquisition function of the score arithmetic unit 520 may acquire the estimation data, in accordance with the arithmetic model, on the basis of the data indicating the number of times of use according to the functional elements acquired by the first acquisition function implemented by the arithmetic-use data acquisition unit 510. Further, the arithmetic model may be generated by machine learning based further on the data indicating the number of times of use according to the functional elements.

The arithmetic model used by the score arithmetic unit 520 or the coordinate arithmetic unit is not limited to the one using a neural network model; it may be one that can be constructed by applying any machine learning algorithm. For example, the arithmetic model may be one that is capable of machine learning in accordance with logistic regression, support vector machine (SVM), decision tree, random forests model (RFM), Q-learning, deep Q-network (DQN), genetic programming, functional logic programming, self-organizing map, or the like.

For such an arithmetic model, different arithmetic models may be prepared for each user who can use the plurality of types of functional elements provided by the information processing services, or a common arithmetic model may be prepared for a plurality of users. Different arithmetic models may be prepared for each group of users. In this case, the plurality of users may be grouped on the basis of some or all of attributes included in the attribute information, such as user type, age, gender, location, etc., or on the basis of the usage level shown in the characteristic information.

The information processing services provided by the information processing system 1 are not limited to those for performing calculations based on mathematical expressions or drawing graphs or figures, but may, for example, provide a plurality of types of functional elements that can be used by users to learn foreign languages, programming languages, or other subject contents. The services may also provide a plurality of types of functional elements that can be used by users to create, edit, or view various types of blueprints. A blueprint may be any blueprint, such as a circuit blueprint, building blueprint, or other industrial product blueprint. Alternatively, the services may provide a plurality of types of functional elements that can be used by users to create, edit, or view various types of text. They may provide a plurality of types of functional elements that can be used by users to play games. They may provide a plurality of types of functional elements that can be used by users to do online shopping. They may provide a plurality of types of functional elements that can be used by users to conduct virtual tours. Besides the above, they may be any information processing services that provide a plurality of types of functional elements that can be used by users to create, edit, or view any image or audio data, and are capable of presenting information on the functional elements.

The information processing services are not limited to those provided by the information processing system 1 to which the server device 10 and the terminal device 20 can be connected via the network 30. For example, software may be installed in a single personal computer to provide the information processing services similar to those provided by the information processing system 1. In this case, the processing performed by the server device 10 and the terminal device 20 in the above embodiment may be performed in a single personal computer, and the information on the functional elements available in the information processing services may be presented by display output on a display output device or the like.

The program to be executed by the server device 10 and the terminal device 20 is applicable by storing it in a computer-readable storage medium such as a flexible disk, compact disc (CD)-ROM, digital versatile disc (DVD)-ROM, memory card, or the like. Further, the program can be superimposed on a carrier wave and applied via a communication medium such as the Internet. For example, the program may be posted and distributed on a bulletin board system (BBS), which is a bulletin board on a communication network, or the program may be stored on a file transfer protocol (FTP) server and made available for download. It may then be configured such that the above-described processing can be executed by starting and running the program under the control of the operating system (OS).

The other specific details of the configuration, control procedures, display examples, and so on indicated in the above embodiment may be modified as appropriate within the range not departing from the gist of the present invention. While several embodiments of the present invention have been described, the scope of the present invention is not limited to the embodiments described above; rather, it includes the scope as recited in the claims and equivalent thereof.

What is claimed is:

1. A non-transitory computer-readable recording medium having stored thereon a program that is executable by at least one processor of an information processing apparatus to control the at least one processor to:
   acquire first state data indicating a state in which a first target person has used a functional element realized by execution of a target program;
   acquire estimation data for estimating information on the functional element matched to the first target person, in accordance with an arithmetic model, based on the acquired first state data, the arithmetic model being generated by machine learning based on at least one of second state data indicating a state in which a second target person different from the first target person has used the functional element in the past and the first state data saved in the past; and cause a presentation unit to present the information on the functional element based on the acquired estimation data, wherein the first state data and the second state data are image data showing a thumbnail image of a screen display with the functional element used.

2. The recording medium according to claim 1, wherein:
the arithmetic model is generated by machine learning based further on attribute data indicating a combination of some or all of gender, age, and location of at least one of the first target person and the second target person, and the program is executable by the at least one processor to control the at least one processor to:

further acquire the attribute data of the first target person, and acquire the estimation data, in accordance with the arithmetic model, based on the first state data and the acquired attribute data of the first target person.

3. The recording medium according to claim 1, wherein the program is executable by the at least one processor to control the at least one processor to cause the presentation unit to present information varying in degree of detail according to a plurality of types of said functional elements based on the estimation data.

4. The recording medium according to claim 1, wherein the program is executable by the at least one processor to control the at least one processor to cause the presentation unit to present information varying in quantity according to a plurality of types of said functional elements based on the estimation data.

5. The recording medium according to claim 1, wherein the information on the functional element is support information showing a way of use corresponding to a plurality of types of said functional elements.

6. The recording medium according to claim 1, wherein the program is executable by the at least one processor to control the at least one processor to cause the presentation unit to present the information on the functional element in different presentation manners according to a plurality of types of said functional elements based on the estimation data.

7. The recording medium according to claim 1, wherein the program is executable by the at least one processor to control the at least one processor to determine different positions in the presentation unit according to a plurality of types of said functional elements to be positions where the information on the functional elements is to be presented, based on the estimation data.

8. The recording medium according to claim 1, wherein the program is executable by the at least one processor to control the at least one processor to:

acquire coordinate data indicating coordinates of the information on a plurality of types of said functional elements, in accordance with the arithmetic model, based on the acquired first state data, and change a position in a display unit serving as the presentation unit where the information on the functional element is to be presented, based on the acquired coordinate data.

9. The recording medium according to claim 1, wherein the program is executable by the at least one processor to control the at least one processor to:

acquire at least one of the first state data and the second state data together with teacher data different from the first state data and the second state data, and update the arithmetic model by machine learning based on the teacher data and the at least one of the first state data and the second state data.

10. The recording medium according to claim 1, wherein the functional element includes a functional element related to calculation and a functional element related to drawing realized by execution of a learning program as the target program.

11. An information processing method of an information processing apparatus, the method comprising:

acquiring first state data indicating a state in which a first target person has used a functional element realized by execution of a target program;

acquiring estimation data for estimating information on the functional element matched to the first target person, in accordance with an arithmetic model, based on the acquired first state data, the arithmetic model being generated by machine learning based on at least one of second state data indicating a state in which a second target person different from the first target person has used the functional element in the past and the first state data saved in the past; and causing a presentation unit to present the information on the functional element based on the acquired estimation data, wherein the first state data and the second state data are image data showing a thumbnail image of a screen display with the functional element used.

12. The information processing method according to claim 11, wherein the arithmetic model is generated by machine learning based further on attribute data indicating a combination of some or all of gender, age, and location of at least one of the first target person and the second target person, and the information processing method comprises:
further acquiring the attribute data of the first target person, and acquiring the estimation data, in accordance with the arithmetic model, based on the first state data and the acquired attribute data of the first target person.

13. The information processing method according to claim 11, further comprising causing the presentation unit to present information varying in degree of detail according to a plurality of types of said functional elements based on the estimation data.

14. The information processing method according to claim 11, further comprising causing the presentation unit to present information varying in quantity according to a plurality of types of said functional elements based on the estimation data.

15. The information processing method according to claim 11, wherein the information on the functional element is support information showing a way of use corresponding to a plurality of types of said functional elements.

16. The information processing method according to claim 11, further comprising causing the presentation unit to present the information on the functional element in different presentation manners according to a plurality of types of said functional elements based on the estimation data.

17. The information processing method according to claim 11, further comprising determining different positions in the presentation unit according to a plurality of types of said functional elements to be positions where the information on the functional elements is to be presented, based on the estimation data.

18. An information processing apparatus comprising:
at least one processor that executes a program stored in a storage unit, the at least one processor being operative to:
acquire first state data indicating a state in which a first target person has used a functional element realized by execution of a target program;
acquire estimation data for estimating information on the functional element matched to the first target person, in accordance with an arithmetic model, based on the acquired first state data, the arithmetic model being generated by machine learning based on at least one of second state data indicating a state in which a second target person different from the first target person has used the functional element in the past and the first state data saved in the past; and
cause a presentation unit to present the information on the functional element based on the acquired estimation data,
wherein the first state data and the second state data are image data showing a thumbnail image of a screen display with the functional element used.

* * * * *